(12) United States Patent
Morgan

(10) Patent No.: US 11,882,981 B2
(45) Date of Patent: *Jan. 30, 2024

(54) SYSTEM AND METHOD FOR HOSPITALITY WATER CLEANSING AND MONITORING

(71) Applicant: Sink Tech, LLC, Chicago, IL (US)

(72) Inventor: Declan Morgan, Chicago, IL (US)

(73) Assignee: Sink Tech, LLC, Chicago, IL (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/241,945

(22) Filed: Apr. 27, 2021

(65) Prior Publication Data

US 2021/0244259 A1    Aug. 12, 2021

Related U.S. Application Data

(63) Continuation of application No. 16/202,071, filed on Nov. 27, 2018, now Pat. No. 10,986,978.

(Continued)

(51) Int. Cl.
*A47L 17/02* (2006.01)
*F16K 11/085* (2006.01)
(Continued)

(52) U.S. Cl.
CPC .............. *A47L 17/02* (2013.01); *A47K 1/04* (2013.01); *F16K 11/085* (2013.01); *F16K 31/02* (2013.01); *G05D 9/12* (2013.01); *G05D 23/1927* (2013.01)

(58) Field of Classification Search
CPC ...... F16K 5/0442; F16K 11/085; F16K 31/02; A47L 17/02; A47K 1/04; Y10T 137/2499;
(Continued)

(56) References Cited

U.S. PATENT DOCUMENTS 170,576 A  *  11/1875  Malcom ................ F16K 5/0605
                                                  137/589
198,515 A  *  12/1877  Johsnon .................... B05B 1/12
                                                  251/311
(Continued)

FOREIGN PATENT DOCUMENTS

DE           3816378       ‡ 12/1988
DE          19831797       ‡  2/1999

OTHER PUBLICATIONS

International Search Report and Written Opinion of the International Searching Authority prepared by the USPTO in connection with PCT/US2018/062678, dated Jan. 31, 2019; Entire Document (50 pages).‡

*Primary Examiner* — William M McCalister
(74) *Attorney, Agent, or Firm* — K&L Gates LLP

(57) ABSTRACT

An operating assembly for use with a sink or bathtub having at least one fluid-holding basin and a basin drain includes an actuator and a housing. The housing includes a plug structure at, or near, a bottom portion of the housing for selectively blocking the basin drain and a drain valve comprising an inlet adjacent a bottom portion of the housing controlled by the actuator to be in an open position or a closed position. The inlet of the drain valve is provided on a first side of the housing, and the outlet of the drain valve is provided on a second side of the housing opposite the first side and directs fluid into the plug structure. The plug structure mates with the basin drain to prevent fluid in the basin from escaping into the drain other than through the drain valve.

10 Claims, 15 Drawing Sheets

Related U.S. Application Data

(60) Provisional application No. 62/673,839, filed on May 18, 2018.

(51) Int. Cl.
 *G05D 23/19* (2006.01)
 *G05D 9/12* (2006.01)
 *A47K 1/04* (2006.01)
 *F16K 31/02* (2006.01)

(58) Field of Classification Search
 CPC ........ Y10T 137/85946; G05D 23/1927; G05D 9/12
 USPC ........... 251/309, 310, 311, 312; 137/88, 562
 See application file for complete search history.

(56) References Cited

U.S. PATENT DOCUMENTS

| | | | | |
|---|---|---|---|---|
| 204,162 | A * | 5/1878 | Munger | A01C 23/042 137/584 |
| 292,824 | A * | 2/1884 | Kennedy | F16K 5/0647 137/625.22 |
| 434,094 | A * | 8/1890 | Schwachheim | F16K 1/20 137/614.17 |
| 474,048 | A * | 5/1892 | Poh | B65D 83/205 222/440 |
| 663,646 | A * | 12/1900 | Tait | B01D 35/04 210/275 |
| 873,518 | A * | 12/1907 | Donat | E03C 1/284 137/625.22 |
| 877,181 | A * | 1/1908 | Dzur | E03C 1/284 137/625.22 |
| 905,818 | A * | 12/1908 | Langford | F04F 5/10 137/562 |
| 978,256 | A * | 12/1910 | Wright | B01L 3/567 137/614.12 |
| 986,601 | A * | 3/1911 | Smith | E03C 1/306 137/550 |
| 1,049,898 | A * | 1/1913 | Moneuse | F16K 5/0214 251/183 |
| 1,118,971 | A * | 12/1914 | Tomko | F04F 5/10 137/562 |
| 1,249,837 | A * | 12/1917 | Scheer | F16K 11/0853 251/311 |
| 1,303,996 | A * | 5/1919 | Volkhardt | F16K 5/0605 137/625.22 |
| 1,492,883 | A * | 5/1924 | Kidder | F16K 5/0207 251/297 |
| 1,529,063 | A * | 3/1925 | Gundry | F16K 5/0214 251/310 |
| 1,553,299 | A * | 9/1925 | Adams | E03C 1/086 417/186 |
| 1,597,635 | A * | 8/1926 | Stickdorn | E03C 1/306 285/8 |
| 1,670,950 | A * | 5/1928 | Bell | F16K 5/0207 303/86 |
| 1,826,829 | A * | 10/1931 | Scott | F04F 5/10 137/271 |
| 2,075,061 | A * | 3/1937 | Salvoni | E03D 9/08 251/294 |
| 2,215,853 | A * | 9/1940 | Mcneal | F16K 5/162 137/545 |
| 2,902,253 | A * | 9/1959 | Page | F16K 5/0207 251/209 |
| 3,018,489 | A * | 1/1962 | Saflarski | A47K 5/1211 4/628 |
| 3,066,908 | A * | 12/1962 | Floren | F16K 5/0492 251/283 |
| 3,885,584 | A * | 5/1975 | Hock | F16K 19/00 236/94 |
| 3,974,869 | A * | 8/1976 | Abe | F16K 5/0271 251/317 |
| 4,003,403 | A * | 1/1977 | Nehring | F16K 11/0836 251/286 |
| 4,089,345 | A * | 5/1978 | Eberhardt | F16K 5/0605 251/315.08 |
| 4,124,165 | A * | 11/1978 | Jarvis | E03C 1/08 137/562 |
| 4,258,444 | A * | 3/1981 | Orszullok | G05D 9/12 73/304 C |
| 4,280,498 | A * | 7/1981 | Jensen | A61F 5/4405 604/323 |
| 4,520,516 | A * | 6/1985 | Parsons | F03B 13/00 367/96 |
| 4,610,784 | A * | 9/1986 | Reyniers | A01K 63/04 137/562 |
| 4,758,235 | A * | 7/1988 | Tu | A61M 39/223 604/189 |
| 5,135,199 | A * | 8/1992 | Cross | A61F 5/4407 604/326 |
| 5,199,118 | A * | 4/1993 | Cole | A47K 1/04 4/619 |
| 5,207,251 | A * | 5/1993 | Cooks | G05D 9/12 73/299 |
| 5,339,854 | A * | 8/1994 | Leith | G05D 11/133 137/101.25 |
| 5,409,615 | A * | 4/1995 | Wallman | B01D 17/042 165/300 |
| 6,058,971 | A * | 5/2000 | Palmer | F16L 37/48 137/562 |
| 6,132,407 | A * | 10/2000 | Genese | A61F 5/4405 604/323 |
| 7,647,653 | B1 * | 1/2010 | Catania | A47K 5/1202 4/628 |
| 8,990,972 | B2 * | 3/2015 | Lopaciuk | A47L 15/0086 4/640 |
| 9,874,882 | B2 * | 1/2018 | Hymes | A01K 7/02 |
| 10,986,978 | B2 * | 4/2021 | Morgan | F16K 31/02 |
| 2005/0167625 | A1 * | 8/2005 | Deen | F16K 31/02 239/69 |
| 2005/0279287 | A1 * | 12/2005 | Kroeker | G08B 21/182 119/72 |
| 2007/0192954 | A1 * | 8/2007 | Giagni | G05D 9/12 4/694 |
| 2008/0092965 | A1 * | 4/2008 | Hymes | A01K 7/02 137/624.12 |
| 2008/0115836 | A1 * | 5/2008 | Hsieh | E03C 1/057 137/88 |
| 2008/0257274 | A1 * | 10/2008 | Drouillard | A01K 7/00 119/72 |
| 2009/0077736 | A1 * | 3/2009 | Loberger | E03C 1/01 4/619 |
| 2009/0126100 | A1 * | 5/2009 | Kenoyer | F24H 1/54 29/428 |
| 2009/0178192 | A1 * | 7/2009 | Vassilev | G05D 23/1393 4/668 |
| 2009/0261282 | A1 * | 10/2009 | Connors | F16K 51/00 251/129.01 |
| 2011/0127291 | A1 * | 6/2011 | Tramontina | B05B 11/3001 222/638 |
| 2011/0240061 | A1 * | 10/2011 | Cantrell | A47L 15/16 134/25.2 |
| 2011/0271441 | A1 * | 11/2011 | Bayley | A47K 1/04 4/638 |
| 2012/0097256 | A1 * | 4/2012 | Lopaciuk | A47L 15/0055 137/391 |
| 2012/0260729 | A1 * | 10/2012 | Bayley | G01F 23/363 73/307 |
| 2013/0085618 | A1 * | 4/2013 | Ding | G05D 7/0664 700/282 |
| 2014/0096930 | A1 * | 4/2014 | Krug, Jr. | F24F 11/64 138/90 |
| 2015/0227142 | A1 * | 8/2015 | Hutchings | G05B 15/02 700/282 |
| 2015/0237826 | A1 * | 8/2015 | Van Der Poel | A01K 39/02 119/74 |
| 2015/0277448 | A1 * | 10/2015 | Shimamura | F04D 15/0066 137/391 |

(56) References Cited

U.S. PATENT DOCUMENTS

| | | | | |
|---|---|---|---|---|
| 2016/0174522 A1* | 6/2016 | Colica | ................... | G05D 9/12 |
| | | | | 119/73 |
| 2017/0235318 A1* | 8/2017 | Bright | ................ | G05D 7/0635 |
| | | | | 137/2 |
| 2017/0328047 A1* | 11/2017 | Murata | ................. | C02F 1/4672 |
| 2017/0350107 A1* | 12/2017 | Braddock | ............... | E03C 1/242 |
| 2019/0097416 A1* | 3/2019 | Schmalz | ............... | G01K 3/005 |
| 2019/0104890 A1* | 4/2019 | Braddock | ............... | G01K 1/14 |
| 2019/0159655 A1* | 5/2019 | Morgan | ................. | F16K 31/02 |
| 2021/0244259 A1* | 8/2021 | Morgan | ................... | A47K 1/04 |
| 2022/0260084 A1* | 8/2022 | Mariano | ............ | F04D 27/0269 |

\* cited by examiner
‡ imported from a related application

SYSTEM AND METHOD FOR HOSPITALITY WATER CLEANSING AND MONITORING

CROSS-REFERENCE TO RELATED APPLICATIONS

This application comprises a continuation of U.S. application Ser. No. 16/202,071 filed Nov. 27, 2018, which claims the benefit of priority to U.S. Provisional Patent Application 62/673,839 filed on May 18, 2018, and U.S. Provisional Patent Application 62/590,968 filed on Nov. 27, 2017, the entireties of which are incorporated herein by reference.

BACKGROUND OF THE INVENTION

The present subject matter relates generally to a system and method for hospitality water cleansing and monitoring. More specifically, the present invention relates to a system of mechanical dispensers and stoppers for three-basin sinks (also referred to as "three-compartment sinks") including sensors and wireless devices placed to collect data related to the sink's sanitation and enable a cloud-based compilation of this same data, as well as cloud-based control of the sink's cleansing and monitoring to reduce risks and overtreatment costs associated with such maintenance.

Three-basin sinks are almost universal in the hospitality industry. In fact, city health codes generally require them. Establishments use these sinks to manage the washing of dishware, glassware, and utensils, using one sink basin (or compartment) to wash, the second basin (or compartment) to rinse, and the third basin (or compartment) to sanitize. Additionally, these sinks must themselves be cleansed and maintained. Each of these steps must proceed according to health codes, which specify such things as timing, temperature, and use of bactericide or other sanitizer.

Health code regulations are essential to customer safety and customer satisfaction in the hospitality industry. Likewise, cleanliness of dishware, glassware and utensils also is essential to customer satisfaction in the hospitality industry. However, whereas the high standards that characterize health codes are designed to exact safety, they are not designed to exact efficiency.

Despite the safety that health codes promote, meeting the exacting requirements could strain and overburden hospitality staff, especially at peak times. Hospitality staff are often untrained or improperly trained on how to wash properly dishware, glasses, and utensils. Compliance with regulations, such as those related to three-basin sinks, heretofore required manual attention to cleansing and monitoring. Every detail demanded hands-on attention from hospitality staff, no matter how busy the staff was. The tension between the demands of local regulation and a day's service often lead to careless errors. A sink cleanse may have begun too late, used the wrong temperature water, used too much or too little soap, detergent or sanitizer, or occurred too frequently. The term "soap" as used herein includes soap, detergent or similar substance. These mistakes were no small matter to inspectors or restaurant and bar owners, and each could result in costly fines or wastes of resources that strained and drained an establishment's resources. Additionally, each could lead to dishware, glasses and utensils being unclean, which could diminish customer satisfaction and, in turn, harm an establishment's reputation and revenue. Keeping pace with both regulations and service, however, was not the only problem with hospitality water cleansing and maintenance.

Additionally, the records keeping associated with cleansing and maintenance compliance was often cumbersome, unreliable and lead establishments away from efficient operations. For example, although an establishment may have kept records of when a cleansing wash occurred, these records were usually kept on a hard copy document that noted the date and time of the cleanse, but not information such as the amount of cleaning solution or water used, duration of the cleanse, or any fluctuations in temperature. Additionally, some establishments find it difficult to make a record of every transaction. These practices lead establishments away from efficient operations because these records did not provide insightful operational data in an accessible manner. Because, for example, the establishment manager did not know how much cleaning solution was being used for cleansing, she could not know whether the cleaning solution was being used efficiently.

The previously available solutions available for dealing with the operational strain that health regulations place on establishments seemed to only compound the issue. For example, an establishment could bring on additional staff to ensure compliance. Such staffing or hiring, however, was not necessarily operationally efficient since many of the costly errors that occurred in cleansing and maintenance were rooted in the inherent error-prone nature of the process, rather than a lack of personnel. Furthermore, adding employees to the payroll added to the compliance costs.

Similarly, previously available procedural solutions only made operations more unwieldy. For example, if establishments wanted more detailed information on the cleansing and maintenance associated with three-basin sinks, they could have required their staff to keep more detailed records. This solution only put additional burdens on an already overburdened staff. A new solution is needed that provides a system and method that allows establishments to seamlessly track and control operations with efficiency and precision as the demands of a service change from day-to-day and even minute-to-minute.

Accordingly, there is a need for a system and method that allows establishments to operate, clean and monitor such appliances as three-basin sinks in a manner that addresses the costly operational inefficiencies described herein. There are also additional opportunities to meet needs in related circumstances, such as the automatic filling, cleaning and draining of bath tubs and the like.

BRIEF SUMMARY OF THE INVENTION

To meet the needs described above and others, the present disclosure provides systems and methods of making and using a sink device fitted with sensors that measure characteristics related to the water cleansing and maintenance of the sink and its turnover and communicate this data to a cloud-based system that automatically or remotely operates mechanisms that control soap dispensation, sanitizer dispensation, liquid level, water temperature and dispensation, water cleanliness (with or without soap or sanitizer in solution) and draining, as required for hospitality regulation compliance. Although three-compartment sinks are the primary subject matter used in the following examples to illustrate the features and functions of the systems and methods, the features and functions provided by the present disclosure may be adapted for use in other sinks, tubs, and the like. For example, the features and functions could be used in single-basin or double-basin sinks or sinks with more than three basins, including without limitation four-compartment sinks. In another example, the automatic and/ or timed basin filling, soap dispensing, and temperature controls are well suited for drawing and maintaining a bath in a bathroom tub. In yet another example, having only a subset of the features and functions, such as a system including only sensors to measure and report temperature and cleanliness so that staff can take manual actions to drain and dispense water, soap and/or sanitizer can be helpful. As used herein, the terms "basin" and "compartment" shall have the same meaning and neither shall be limited to any particular shape.

In a primary embodiment, the system provided herein is a cloud-connected sink solution intended to keep a three-basin sink in compliance at all times. The water temperature in each of the basins is controlled via a sensor that determines when the temperature has fallen below acceptable levels (programmable based on local code). The sensor could be a thermistor, thermocouple, or any other suitable temperature sensor available now or in the future. In response to the sensor readings, the basin controls open the one or more basin valves required to drain the water whose temperature has fallen below code. Subsequently, one or more input flow controls open to fill the respective one or more basins with fresh, hot water.

In some cases, only a portion of the water needs to be drained and refilled to achieve the desired temperature. The filling operation is controlled such that only the amount required to prepare the sink to the required liquid level is used. As an alternative to draining and refilling the basin to achieve the desired temperature, the system could include a heater, such as a submersible heater in the basin, for maintaining the water's temperature. Accordingly, the system eliminates common problems, such as when a bartender drains an entire basin when draining only a portion would suffice or sets the sink to fill and then gets distracted (often for an extended period of time), which results in significant water and energy waste as the excess water drains out through the overflow outlet.

In addition to, and independent from, the water temperature requirements, water cleanliness must meet code standards. The present system uses cleanliness sensors (e.g., one or more turbidity and/or pH sensors) to determine when a full or partial fresh fill, with soap and sanitizer, is required. The cleanliness sensors, in connection with soap and sanitizer release valves, control the inflow of the appropriate amount of soap and sanitizer with incoming fresh hot water to refill each of the basins in the three-basin sink, as needed, to remain code compliant (or to meet more stringent establishment guidelines). As a result, the system provides an energy-efficient and resource-efficient water control system automating the maintenance of the three-basin sink, keeping users within compliance with health code or other targeted metrics.

Based on the monitored characteristics, the system may further prompt a user regarding, or automatically execute itself, any additional cleansing or maintenance that may be required. For example, a notification may be provided to the user (at the basin or through an associated software platform) when additional deep cleaning of one or more of the basins may be required or desired.

Further, through additional sensors cooperating with the storage of the soap and sanitizer reserves, the present system is aware of soap and sanitizer levels available. Using this data, the system can alert the user when a supply gets low and also, using Internet of Things ("IOT") connectivity, reorder product for delivery in a timely manner.

By providing mechanisms that can be automated and/or controlled remotely, the present system is an efficient solution that turns cumbersome manual compliance into something as easy as pushing a button. Using the relevant compliance parameters for a sink's cleansing and maintenance, users simply program the sink's components from a mobile device or computer on which the system's software is installed. The software ensures that the controlled sink device self-executes its operating, cleansing and maintenance following its programmed parameters, thereby ensuring compliance with the relevant regulations.

In some embodiments, the system includes a cloud-based software platform that stores the data collected by the device's sensors and is accessible via a software application operated through a user's mobile device or computer. This platform may include graphic user interfaces that allow establishments to view the relevant data associated with sink cleansing and maintenance, analyze the data, and program devices connected to the platform through wireless communication components.

In the primary example, the system includes a device that may be retrofit to an existing three-basin sink. In other embodiments, one or more of the components of the system may be pre-installed in a three-basin sink at the manufacturer or integrated into the sink during manufacture. In still other examples, the features and functions described herein may be used in a sink other than the standard commercial three-basin sink, including without limitation single-basin, double-basin, four-basin and other styles of sinks, tubs, etc.

The primary components of the system include: an inlet for receiving fresh water supply, a spout for each of the basins for delivering fresh water to the basin, and an inlet water valve for each of the basins to control the delivery of the water from the fresh water supply to the basin; soap and sanitizer inlets for receiving fresh soap and sanitizer supplies, a spout for one or more of the basins for delivering soap and/or sanitizer to the basin, soap and sanitizer dispensing valve(s) for one or more of the basins to control the delivery of such solutions from the fresh supply to the basin; an outlet valve for each of the basins controlling the outflow of the water from the basin into its respective drain; and a set of temperature, cleanliness and liquid level sensors in each of the basins. Additionally, the system may include soap and sanitizer reserve level sensors that indicate the supply of the one or more cleaning solutions. Each of the components of the system are in communication with a central processor controlling the automation and reporting functions of the system. The processor may be local or remote and the functions of the system may be managed through the processor through a GUI provided via a mobile application or similar software.

In one embodiment of the invention, a system for use with a sink or bathtub having at least one fluid-holding basin and a basin drain includes one or more operating assemblies, each operating assembly comprising an actuator and a housing. The housing includes a plug structure at, or near, a bottom portion of the housing for selectively blocking the basin drain and a drain valve comprising an inlet adjacent a bottom portion of the housing controlled by the actuator to be in an open position or a closed position. When the drain valve is in the open position, fluid in the basin is able to flow through the drain valve into the basin drain and, when the drain valve is in the closed position, fluid in the basin is unable to flow through the valve into the basin drain. The housing further includes one or more sensors from among a temperature sensor, a cleanliness sensor, and a liquid level sensor, one or more water valves operable between open and closed conditions to selectively deliver water to the basin, and one or both of a soap dispenser pump and a sanitizer pump operatively connectable to soap and sanitizer reserves, respectively, and operable between active and inactive conditions for selectively delivering soap and sanitizer from the respective reserves to the basin and a processor. The processor receives input from the plurality of sensors and sending commands for controlling the actuator, the one or more water valves, and the soap and/or sanitizer dispenser pumps such that in response to the commands from the processor, the actuator opens or closes the drain valve, the one or more water valves open or close, and the soap and/or sanitizer dispenser pumps are active or inactive, such that the system is capable of automatically filling and draining the basin to maintain a desired range of concentrations of a fluid comprising one or more of water, soap, and sanitizer, and to maintain the fluid in the basin at a desired amount or height and within a desired range of temperature.

In a further embodiment, the system includes three operating assemblies for use with a three-basin sink. The housing may include two or more components fitted together. In some embodiments, at least one of the sensors comprises a cleanliness sensor and the cleanliness sensor comprises one or both of turbidity sensor and a pH sensor. In other embodiments, the system further includes soap and sanitizer reserve level sensors indicating the available supply of a reserve of soap and a reserve of sanitizer.

In another embodiment, the housing is configured to retrofit into the basin. In other embodiments, the operating assembly is integrally formed with the basin. The one or more sensors may comprise a temperature sensor, a cleanliness sensor, and a liquid level sensor.

In another embodiment of the invention, a system for use with a three-basin sink including three fluid-holding basins, each including a basin drain, includes three operating assemblies, each associated with one of the basins in the three-basin sink. Each operating assembly includes an actuator and a housing. The housing includes a plug structure at, or near, a bottom portion of the housing for selectively blocking the respective basin drain, a drain valve comprising an inlet adjacent a bottom portion of the housing controlled by the actuator to be in an open position or a closed position. When the drain valve is in the open position, fluid in the respective basin is able to flow through the drain valve into the respective drain and, when the drain valve is in the closed position, fluid in the respective basin is unable to flow through the valve into the respective basin drain. The system further includes one or more sensors from among a temperature sensor, a cleanliness sensor, and a liquid level sensor, three water valves operable between open and closed conditions to selectively deliver water to each of the three basins, and one or both of a soap dispenser pump and a sanitizer pump operatively connectable to soap and sanitizer reserves, respectively, and operable between active and inactive conditions for selectively delivering soap and sanitizer from the respective reserves to at least one of the three basins, and a processor. The processor receives input from the plurality of sensors and sends commands for controlling the actuator, the one or more water valves, and the soap and/or sanitizer dispenser pumps such that in response to the commands from the processor, one or more of the actuators open or close their respective drain valves, the one or more water valves open or close, and the soap and/or sanitizer dispenser pumps are active or inactive, such that the system is capable of automatically filling and draining each basin to maintain a desired range of concentrations of a fluid comprising one or more of water, soap, and sanitizer, and to maintain the fluid in each basin at a desired amount or height and within a desired range of temperature.

In a further embodiment, an assembly for placement in a sink or bathtub having one or more basins having a drain includes a passageway through which, when the assembly is in use in a basin, fluid in the basin is able to flow toward the drain, a structure configured to be situated relative to the passageway operable between open and closed positions selectively blocking the passageway when in a closed position and not blocking the passageway when in an open position, such that fluid in a basin is able to flow through the passageway when the structure is in the open position but not when the structure is in the closed position. The system also includes an actuator controlling the position of the structure between the closed position and the open position, one or more sensors determining at least a first fluid level in the basin and a second fluid level in the basin, and a processor. The processor is configured to receive one or more inputs from the one or more sensors and to communicate with the actuator, wherein, in response to receiving a first set of one or more inputs from the one or more sensors, the processor generates and communicates a first set of one or more outputs to the actuator causing the actuator to position the structure in the open position. In response to receiving a second set of one or more inputs from the one or more sensors, the processor generates and communicates a second set of one or more outputs to the actuator causing the actuator to position the structure in the closed position.

In further embodiments, the assembly includes a water valve configured to control flow of water from a water source into the basin, wherein operation of the water valve is controlled by the processor in response to the one or more inputs from the one or more sensors. In another embodiment, the assembly includes a first additive fluid valve configured to control flow of a first additive fluid into the basin, wherein operation of the first additive fluid valve is controlled by the processor in response to the one or more inputs from the one or more sensors. The assembly may also include a second additive fluid valve configured to control flow of a second additive fluid into the basin, wherein operation of the second additive fluid valve is controlled by the processor in response to the one or more inputs from the one or more sensors. In some embodiments, the first additive fluid is a soap and the second additive fluid is a sanitizer.

In a further embodiment, the assembly also includes a first additive fluid valve configured to control flow of a first additive fluid into a first basin, wherein operation of the first additive fluid valve is controlled by the processor in response to the one or more inputs from the one or more sensors, and a second additive fluid valve configured to control flow of a second additive fluid into a second basin, wherein operation of the second additive fluid valve is controlled by the processor in response to the one or more inputs from the one or more sensors.

In another embodiment of the invention, a method of automatically draining and filling a basin of a sink or tub with water includes the steps of (1) sending a first signal from a controller to an actuator associated with a drain in the basin to close the drain preventing any fluid in the basin from exiting the basin through the drain; (2) sending a second signal from the controller to one or more water supply valves controlling flow of water from one or more water supplies to cause water to flow into the basin; (3) sending a third signal from the controller to the one or more water supply valves when fluid in the basin reaches a predetermined amount or height of fluid, thereby preventing additional water from flowing into the basin; and (4) sending a fourth signal from the controller to the actuator associated with the drain to open the drain allowing water in the basin to exit the basin through the drain.

In some embodiments, one or more of the first signal, the second signal, the third signal, and the fourth signal are generated by the controller in response to input received from one or more sensors that detect an amount or height of fluid in the basin. In a further embodiment, the first signal, the second signal, the third signal, and the fourth signal may all be the same signal or any combination of different signals and/or where each of the signals may be generated based on input from a single sensor or from a plurality of sensors. The method may include the step of sending a fifth signal from the controller to a first additive fluid valve causing a first additive fluid to flow into the basin and/or the step of sending a sixth signal from the controller to a second additive fluid valve causing a second additive fluid to flow into the basin.

In a further embodiment, a method of automatically draining and filling two or more basins of a single sink or tub, or each basin of two or more adjacent sinks or tubs, with a fluid. The method includes the steps of (1) sending a first signal from a controller to an actuator associated with a drain in the basin to close the drain preventing any fluid in the basin from exiting the basin through the drain; (2) sending a second signal from the controller to one or more water supply valves controlling flow of water from one or more water supplies to cause water to flow into the basin; (3) sending a third signal from the controller to the one or more water supply valves when fluid in the basin reaches a predetermined amount or height of fluid, thereby preventing additional water from flowing into the basin; and (4) sending a fourth signal from the controller to the actuator associated with the drain to open the drain allowing water in the basin to exit the basin through the drain.

In another embodiment, an apparatus for draining and filling a basin of a sink or tub with water includes one or more water supply valves configured to control flow of water from one or more water supplies operable between an open condition and a closed condition in response to one or more signals (each a "water valve signal") received from a controller. The water from the water supply is able to flow through the one or more water supply valves when the one or more water supply valves are in the open condition and water from the water supply is unable to flow through the one or more valves when the one or more valves are in the closed condition. The apparatus includes a plug configured to be associated with a drain in the basin, the plug operable between an open condition and a closed condition in response to one or more signals (each a "drain plug signal") received from the controller, wherein a fluid in the basin is able to flow into the drain when the plug is in the open condition and the fluid in the basin is unable to flow into the drain when the plug is in the closed condition. The apparatus may also include one or more sensors detecting an amount or height of the fluid in the basin, wherein the one or more sensors sends a signal to the controller which processes the signal and sends a first water valve signal to the one or more water supply valves causing the one or more water supply valves to be in the closed condition, or validate that the one or more water supply valves are in the closed condition, when the one or more sensors detects a first amount or height of the fluid in the basin or sends a second water valve signal to the one or more water supply valves causing the one or more water supply valves to be in the open condition, or validate that the one or more water supply valves are in the open condition, when the one or more sensors detects a second amount or height of the fluid in the basin.

In some embodiments, the one or more water supply valves, plug, or one or more sensors are integrated into the sink or tub. In other embodiments, all or a majority of the one or more water supply valves, plug, or one or more sensors are integrated into the sink or tub.

Finally, in another embodiment, an apparatus for automatically draining and filling two or more basins of a single sink or tub, or each basin of two or more adjacent sinks or tubs, with a fluid includes one or more water supply valves configured to control flow of water from one or more water supplies operable between an open condition and a closed condition in response to one or more signals (each a "water valve signal") received from a controller. The water from the water supply is able to flow through the one or more water supply valves when the one or more water supply valves are in the open condition and water from the water supply is unable to flow through the one or more valves when the one or more valves are in the closed condition. The apparatus further includes a plug configured to be associated with a drain in the basin, the plug operable between an open condition and a closed condition in response to one or more signals (each a "drain plug signal") received from the controller. A fluid in the basin is able to flow into the drain when the plug is in the open condition and the fluid in the basin is unable to flow into the drain when the plug is in the closed condition. Finally, the apparatus includes one or more sensors detecting an amount or height of the fluid in the basin. The one or more sensors send a signal to the controller which processes the signal and sends a first water valve signal to the one or more water supply valves causing the one or more water supply valves to be in the closed condition, or validate that the one or more water supply valves are in the closed condition, when the one or more sensors detects a first amount or height of the fluid in the basin or sends a second water valve signal to the one or more water supply valves causing the one or more water supply valves to be in the open condition, or validate that the one or more water supply valves are in the open condition, when the one or more sensors detects a second amount or height of the fluid in the basin.

The system may be hard-wired into or plugged into an outlet of an establishment's existing electrical system. In other embodiments, the system may be battery operated.

In a presently preferred implementation of the teachings herein, a smart sink system comprises: a housing inserted into a sink basin blocking a sink basin drain, the housing including: a motor; a drain inlet adjacent a bottom portion of the housing controlled by the motor to be in an open position or a closed position, wherein, when the drain inlet is open, fluid in the sink basin drains and, when the drain inlet is closed, fluid in the sink basin is prevented from draining; an overflow inlet located above the drain inlet; a passage in the housing providing unimpeded fluid communication from the overflow inlet to the sink basin drain; and a plurality of sensors, including a temperature sensor, a turbidity sensor, and at least one liquid level sensor; one or more water valves that, when open, deliver water to the sink basin; a soap dispenser pump that, when active, delivers soap to the sink basin; a sanitizer dispenser pump that, when active, delivers sanitizer to the sink basin; and a processor receiving input from the plurality of sensors and controlling the motor, the one or more water valves, the soap dispenser pump, and the sanitizer dispenser pump such that in response to the commands from the processor, the one or more water valves, the soap dispenser pump, the sanitizer dispenser pump, and the motor automatically fill and drain the sink basin to maintain a desired range of concentrations of soap, sanitizer, and to maintain the water in the sink basin at a desired amount or height and within a desired range of temperature.

In another presently preferred implementation of the teachings of the invention a smart sink system comprises: a housing inserted into each sink basin in a three-basin sink blocking a respective sink basin drain, each housing including: a motor; a drain inlet adjacent a bottom portion of the housing controlled by the motor to be in an open position or a closed position, wherein, when the drain inlet is open, fluid in the respective sink basin drains and, when the drain inlet is closed, fluid in the respective sink basin is prevented from draining; an overflow inlet located above the drain inlet; a passage in the housing providing unimpeded fluid communication from the overflow inlet to the sink basin drain; and a plurality of sensors, including a temperature sensor, a turbidity sensor, a pH sensor, and at least one liquid level sensor; one or more water valves that, when open, deliver water to the sink basin; a soap dispenser pump that, when active, delivers soap to a chosen one or more of the sink basins; a sanitizer dispenser pump that, when active, delivers sanitizer to a chosen one or more of the sink basins; and a processor receiving input from the plurality of sensors and controlling the motor, the one or more water valves, the soap dispenser pump, and the sanitizer dispenser pump such that in response to the commands from the processor, the one or more water valves, the soap dispenser pump, the sanitizer dispenser pump, and the motor automatically fill and drain each of the three sink basins to maintain a desired range of concentrations of soap, sanitizer, and to maintain the water in each of the three sink basins at a desired amount or height and within a desired range of temperature.

An object of the invention is to provide a solution to the costly errors and inefficiencies associated with manual filling, cleansing and maintenance of sinks.

In a primary embodiment, the system is a complete plug-and-play solution in a modular design. It is easily installed and does not require a plumber. The device keeps the water temperatures at required levels and ensures the correct amount of soap and sanitizer are automatically added to the water. When connected to the cloud, the system keeps track of water usage, soap and sanitizer use, administers notifications when there is low stock of soap and sanitizer, and can automatically reorder products without human intervention. The system can save more water than dishwashers or manually-monitored three-basin sinks. The system is able to regulate the temperature and cleanliness of the water in each basin without needing to completely empty and refill the entire basin. The system may also include one or more heaters for helping to maintain the desired temperature of the water in each basin.

A smart sink such as the one described herein helps to consistently clean and sanitize glassware to avoid concerns about health and cleanliness, for the establishment, customers, and health inspectors. Additionally, it helps lead to higher employee satisfaction and higher customer satisfaction. It can be installed on a single sink within an establishment's facility, or multiple sinks within the facility, or multiple sinks across different facilities under common ownership, in all cases with the data able to be captured and analyzed at a single point if desired.

An advantage of the invention is that the user simply needs to use a computer interface to select parameters for a mechanical system to remotely automate or control cleansing and maintenance for sinks.

Another advantage of the invention is that it allows hospitality establishments to precisely regulate cleansing and maintenance.

Yet another advantage of the invention is that it collects and compiles data from hospitality cleansing and maintenance into an easily accessible format.

A further advantage of the invention is that it allows establishments to adjust cleansing and maintenance operations in real time as the demands of a particular night's service change.

Another advantage of the invention is that it allows establishments to quickly access and present data on sink cleansing and maintenance to satisfy compliance requests.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The figures depict embodiments of the subject matter presented herein and are offered as examples only, not as limitations, as will be appreciated by those skilled in the art.

DETAILED DESCRIPTION OF THE INVENTION

Figure 1:
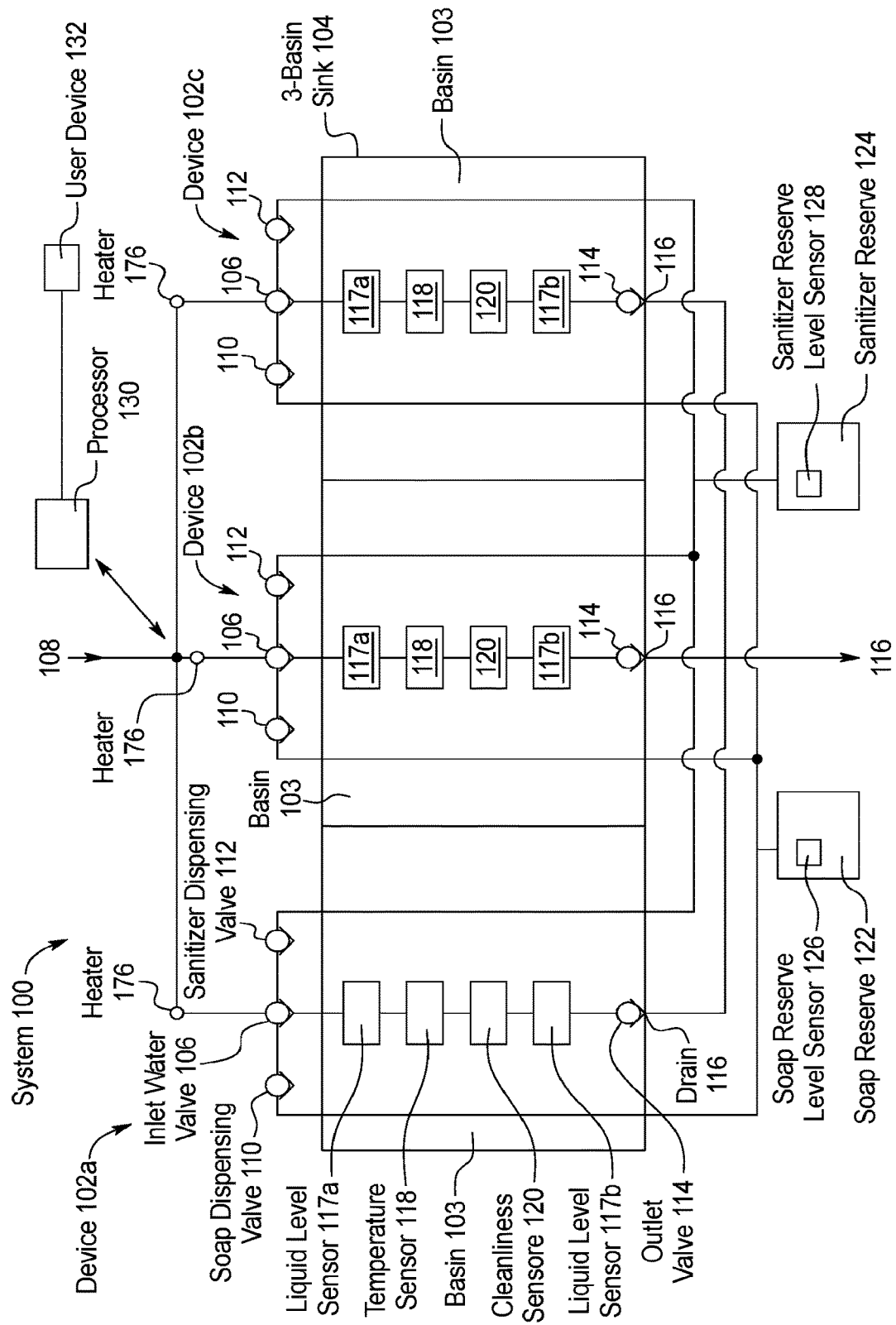
FIG. 1 is a schematic diagram illustrating components of an example of a system of the present invention.

FIG. 1 illustrates a system 100 for water filling, cleansing, and monitoring. In the embodiment illustrated in FIG. 1, the system 100 includes a first basin device 102a, a second basin device 102b, and a third basin device 102c (each a device 102 or basin operating device 102), each of which is disposed within a basin 103 of a three-basin sink 104. The number of basin operating devices 102 in a system may be varied to match the number of basins in the sink, whether for a single-basin, double-basin, four-basin or other configuration. Associated with each basin operating device 102 is an inlet water valve 106 to control the delivery into the basin 103 of water that arrives through a spout 108. The inlet water valve 106 can be any suitable valve, including without limitation a solenoid valve or motorized ball valve. The spout 108 can be connected to a spout of a sink at which system 100 is mounted or an alternative water supply, including a direct tap into a facility's water supply line. Additionally, the spout 108 could include or be connected to a manifold for separating the incoming water supply to each device 102. Further associated with each device 102 are a soap-dispensing valve 110 and a sanitizer-dispensing valve 112 to control the delivery of soap and sanitizer solutions into each of the basins 103. In other embodiments, the soap and sanitizer solutions may be dispensed from a single valve associated with the system. Further, each device 102 includes a corresponding outlet valve 114 controlling the outflow of the water from each basin into its respective drain 116.

In some embodiments, the basin operating device 102 includes one or more sensors 117, 118, 120 to provide immediate and up-to-date information concerning the status of sink filling, cleansing, and maintenance. The sensors may detect when the sink basin has been filled to a maximum desired level, and measure characteristics such as water temperature, amount of the cleaning solutions dispensed, and volume of water dispensed. The device 102 may also include sensors to measure characteristics of the water in the basin 103 such as such as water temperature and sink fluid cleanliness.

In the embodiment illustrated in FIG. 1, a liquid level sensor 117, a temperature sensor 118, and a cleanliness sensor 120 are positioned along the device 102 within each basin 103. The liquid level sensor 117 could be any suitable sensor, including without limitation a float sensor or optical sensor. In some embodiments, the basin operating device 102 includes a first liquid level sensor 117a near an upper end of the device 102 and a second liquid level sensor 117b near the lower end of the device 102. The temperature sensor 118 could be any suitable sensor, including without limitation a thermistor or thermocouple. The temperature sensor 118 could be separate from or combined and/or integrated with the liquid level sensor. The cleanliness sensor 120 could be any suitable sensor or combination of sensors, including one or both of a turbidity sensor and pH sensor. Each device 102 is connected to or associated with a soap reserve 122 and a sanitizer reserve 124 to supply the soap and sanitizer solutions to each soap and sanitizer dispensing valve 110, 112. A soap reserve level sensor 126 and a sanitizer reserve level sensor 128 positioned within the soap reserve 122 and the sanitizer reserve 124, respectively, indicate the remaining supply of the one or more cleaning solutions. The soap reserve 122 and sanitizer reserve 124 may be located, for example, under the three-basin sink 104 and each of the soap and sanitizer dispensing valves 110, 112 control the output of soap and sanitizer using any suitable pump, including standard pumps. In another embodiment, scales for weighing the soap and sanitizer reserves may be used to determine the amount of supply remaining. Any suitable mechanism or method may be used to indicate the remaining supply.

Each of the components of the system 100 is in communication with a central processor 130 controlling the automation and reporting functions of the system 100. The processor 130 may be local or remote and the functions of the system 100 may be managed though the processor through a graphical user interface (GUI) provided via a mobile application or similar software on a user device 132. The system 100 and/or individual basin operating devices 102 of the system 100 may include manual controls that override automated or remote control. In addition, the central processor 130 may actually be a combination of one or more processing devices in one or more of the components of the system 100, including the sensors, valves, and the like.

Figure 2:
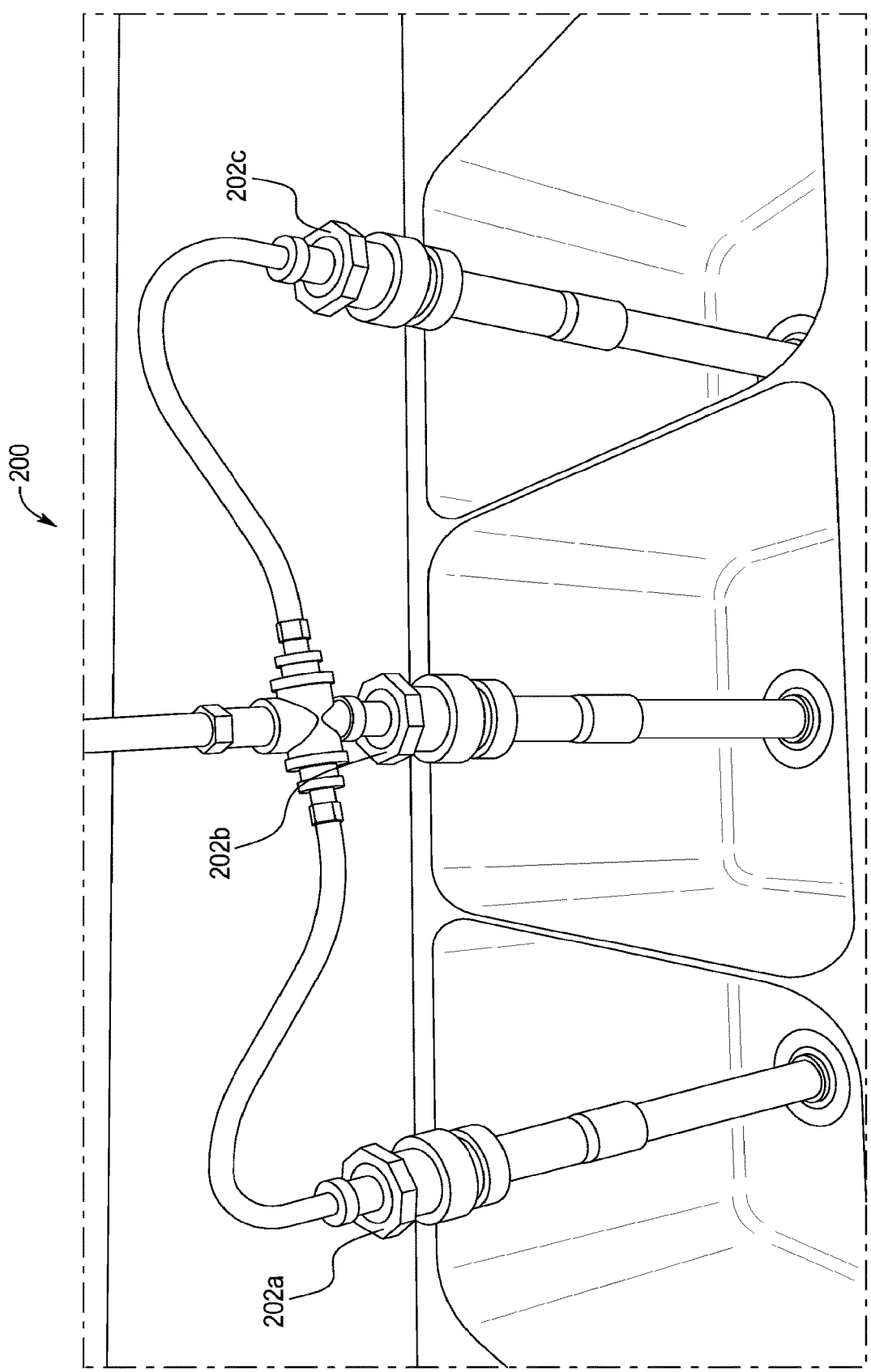
FIG. 2 is an example of elements of the system shown in FIG. 1.

FIG. 2 illustrates a prototype of the system 100 of FIG. 1. As shown in FIG. 2, the system 200 includes first, second, and third basin operating devices 202a, 202b, 202c that are retrofit onto an existing three-basin sink 204. In other embodiments, the components of the system may be pre-installed in a three-basin sink 204 at the manufacture or integrated into the sink 204 during manufacture. In an integrated embodiment, for example, the water, soap and sanitizer feeds may be provided through ports in a side or bottom wall of each basin 103, the drain valve may be integrated into the existing drain area (including the stem below the drain), and the various sensors may be attached to or integrated into any of the walls of the basins 103. Numerous variations may be devised and, based on the disclosure herein, would be apparent to those of ordinary skill in the art.

Figure 3:
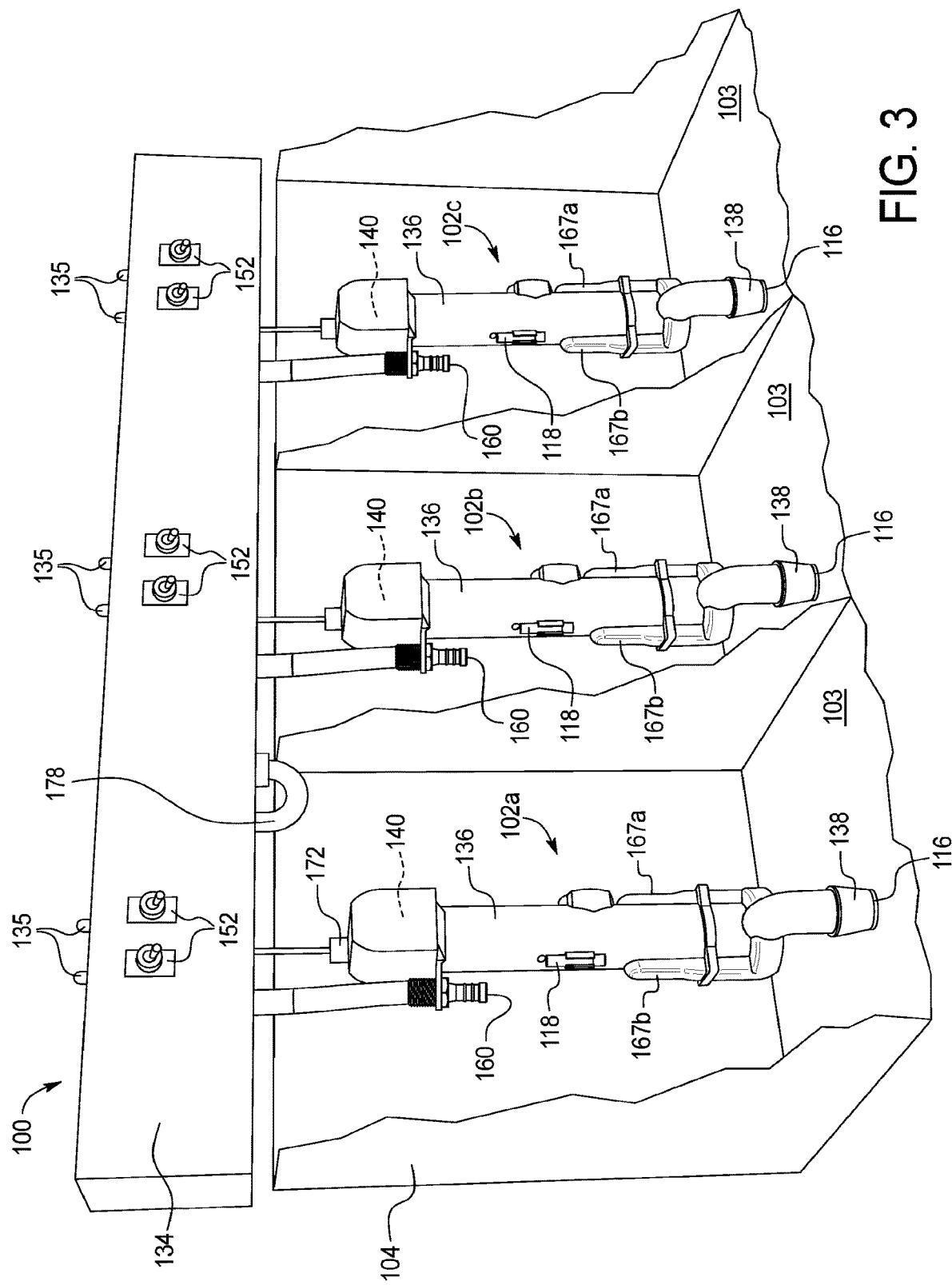
FIG. 3 is another example of elements of the system shown in FIG. 1.

FIG. 3 illustrates an example of a system 100 in which three-basin operating devices 102 depend from a main enclosure 134 (or header) that spans a three-basin sink 104. The header 134 encloses plumbing for the water, soap, and sanitizer supplies to the devices 102. For example, the header 134 may include pipes, hoses, tubes, pumps/motors, and valves. In the example shown in FIG. 3, the valve for the water supply 106 is in the header 134, while the valves for the soap and sanitizer supplies 110, 112 may also be in the header 134 or may be situated remotely at the outlets from the soap and sanitizer reserves. In another example, soap and sanitizer reservoirs may be incorporated into the header 134 or other structures of system 100. The header 134 may further include brackets for mounting the header 134 on the backsplash of a three-basin sink 104, although any suitable method of mounting the header 134 to or near the three-basin sink 104 for operation with the three-basin sink 104 could be used.

In the example shown, each of the three-basin operating devices 102 depend from the header 134 into a respective basin 103. Each device 102 spans from the header 134 to the drain 116 in the basin 103 and includes a valve (outlet valve 114, shown in FIGS. 13 and 14) that controls the draining of fluid from the basin 103 into the drain 116, which must first flow into a housing 136 and then through the valve to the drain. The bottom of each device 102 can be fitted with an adapter 138 (see FIG. 4) serving as a plug to mate with the sink drain 116, so as to prevent fluid in the basin 103 from escaping into the drain 116 other than directly through the valve 114 when it is open. In some examples, adapters are provided for each standard sink drain size. In other examples, an adaptive adaptor is provided to conform to the given drain size.

Figure 14:
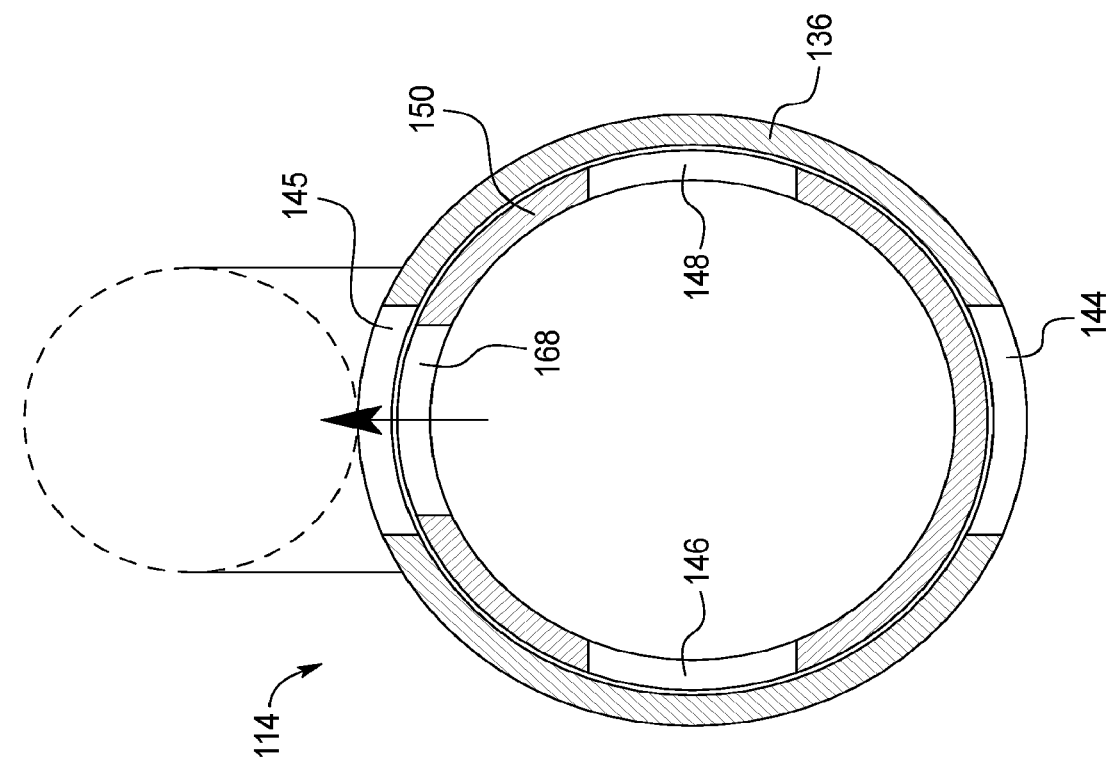
FIG. 14 is an internal view of an outlet valve of the basin device shown in FIG. 6 shown in a second position.
Figure 13:
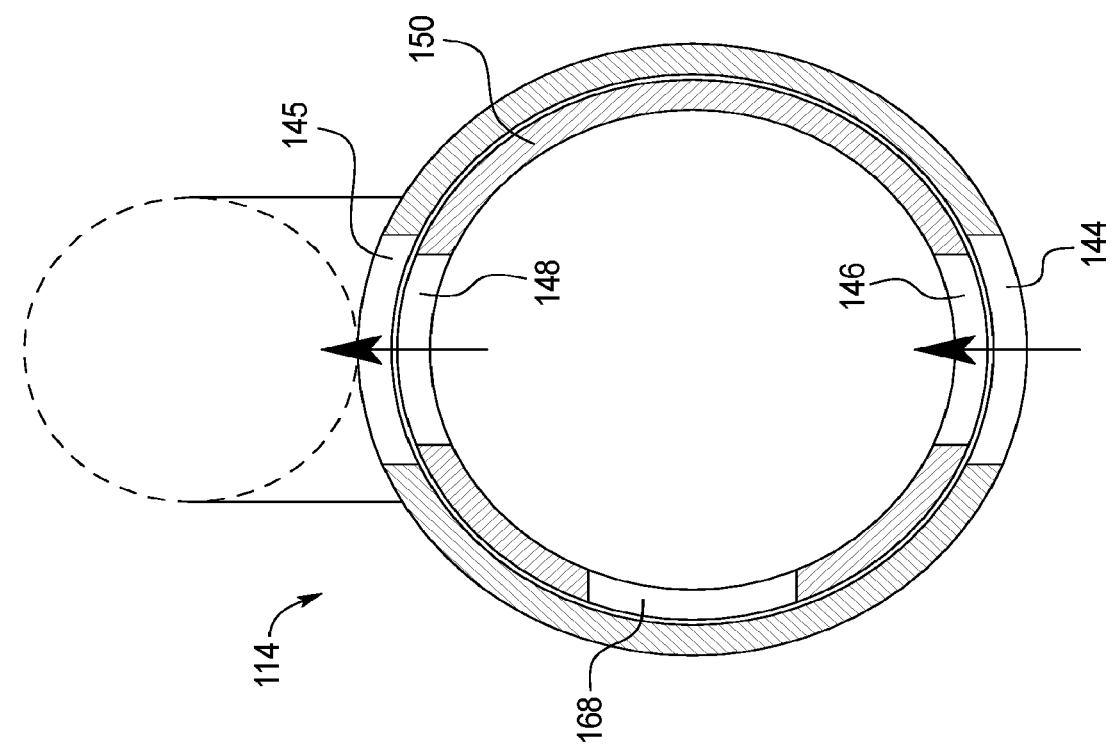
FIG. 13 is an internal view of an outlet valve of the basin device shown in FIG. 6 shown in a first position.

In the example shown best in FIGS. 13 and 14, the outlet valve 114 comprises a barrel valve situated inside a bottom portion of the housing 136 of the three-basin operating device 102, and which is activated (rotated) using a motor 140, such as a non-continuous servo motor, enclosed in a top portion of the housing 136. The motor 140 is in electrical communication with the processor 130. Accordingly, the opening and closing of the outlet valve 114, and thus the drain 116 in each basin 103, is controlled by the processor 130. A shaft extends from the top of the barrel valve 114 and is operably connected to a downward extending shaft of the motor 140, as will be recognized by those skilled in the art. The barrel valve 114 is devised to allow water to flow from the basin 103 to the drain 116. More specifically, referring to FIG. 5, the view of the back of the basin operating device 102 shows a series of small openings 144 (such as a grate) in the wall of the housing 136 near the bottom of the device 102. The openings 144 are on the opposite side of the housing 136 from where the outlet 145 in the housing 136 to the drain 116 is located as shown in FIGS. 13 and 14. The barrel valve 114 has two openings 146, 148 in its barrel 150 so that when one of the two openings 146 is aligned with the grate 144 (FIG. 13), the other of the two openings 148 is aligned with the outlet 145 in the housing 136 to the drain 116, thereby allowing fluid to flow from basin 103, through the grate 144, through the outlet valve 114 and into the drain 116. As shown, the grate 144 forms a screen to help filter the water. To close the outlet valve 114 so that water is unable to flow from the basin 103 to the drain 116, the servo motor 140 rotates the barrel 150 so that a solid portion of the barrel's wall blocks the grate 144 (FIG. 14), thereby preventing water from flowing in from the basin 103.

While the outlet valve 114 is shown herein as a barrel valve 114 actuated by a servo motor 140 and working in combination with openings 144, 145 in the housing 136 of the device 102, any suitable valve mechanism, system or combination of types of valves, motors, actuators, etc. could be used. Alternative valves could include, without limitation, ball valves. Additionally, although the grate 144 is shown as a series of small openings formed in the housing 136, the grate 144 could be wire mesh, screen or other suitably porous material covering one or more openings in the housing. Furthermore, the motor need not be located in the housing 136, and instead could be located in the header 134 or any other suitable location.

As further shown in FIG. 3, the header 134 includes a plurality of switches 152 associated with each three-basin operating device 102 that enable the various functions of the system 100 to be turned on and off. For example, in one embodiment, one or more of the switches 152 are used to toggle between automatic and manual mode for draining the sink 104. In another embodiment, graphical buttons at the GUI are used, e.g., using a touch screen or mouse click, to toggle between automatic and manual mode for draining the sink 104. In manual mode, a press of a button (physical or digital) can cause the sink 104 to automatically drain, fill or a combination thereof. Also shown, LED lights 135 are positioned along the header 134 to display whether the system is on or off and whether the system 100 (or individual basin operating device 102) is in automatic or manual mode. A plurality of LED light colors may be used to indicate different statuses of the system 100. For example, one color of LED lights may be used in indicate that the system is on, another to indicate that the system is undergoing a filling operation, another to indicate that the system is undergoing a draining operation, another to indicate that the system is in manual mode, and so on.

Figure 4:
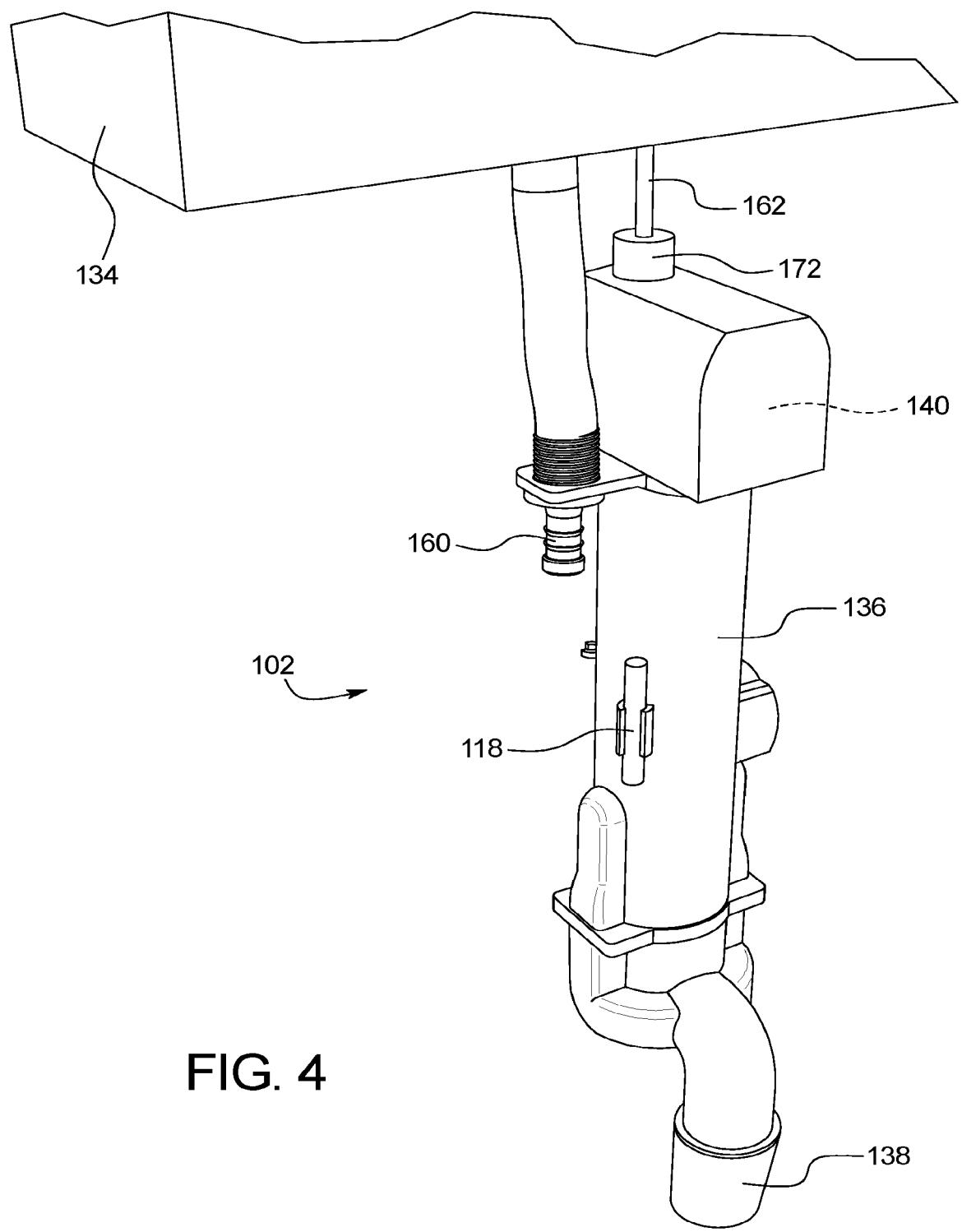
FIG. 4 is a front perspective view of a basin operating device of the system shown in FIG. 3.

As shown in FIG. 4, the water, soap, and sanitizer plumbing (pumps/valves/etc.) in the header 134 all feed into a single spout 160 near the top of the basin operating device 102, through which the fluids flow into the basin 103. As shown, the single spout 160 feeds fluid directly into the basin 103; alternatively, the spout 160 could be connected to a pipe, tube, hose or other conduit or channel included in the housing 136 through which fluid then flows into the basin 103. In other embodiments, some or all of the water, soap, and sanitizer feeds are not combined and, instead, each is fed separately into the basin 103, whether direct into the basin 103 or indirect through the device 102. Furthermore, each such feed may be routed through the header 134 or may be external to the header 134. As also shown, the electric wiring to the sensors, motors, and control systems travels from the housing 136 to the device 102 through a path 162 located above the portion of the device 102 housing the motor 140 for controlling the outlet valve 114 for the drain 116 in the basin 103.

In some three-compartment sinks 104, the first basin 103 is used for holding water combined with soap, the second basin 103 is used for holding water, and the third basin 103 is used for holding water combined with sanitizer. Thus, when a system 100 is used for such arrangement, the soap and sanitizer feeds may be limited to the basins 103 in which they are intended to be used. Oftentimes, a brush or plurality of brushes for cleaning glasses is situated in the first basin containing a combination of water and soap. The brush(es) may be, for example and without limitation, a manual system made by Bar Maid or an electric system with spinning brushes made by Admiral Craft. Brushes may be arranged to clean the inside and outside of a glass simultaneously. The basin operating device 102 is configured so that it can plug the drain 116 and perform its other functions while leaving appropriate space in the basin 103 for a glass-cleaning brush system.

Figure 5:
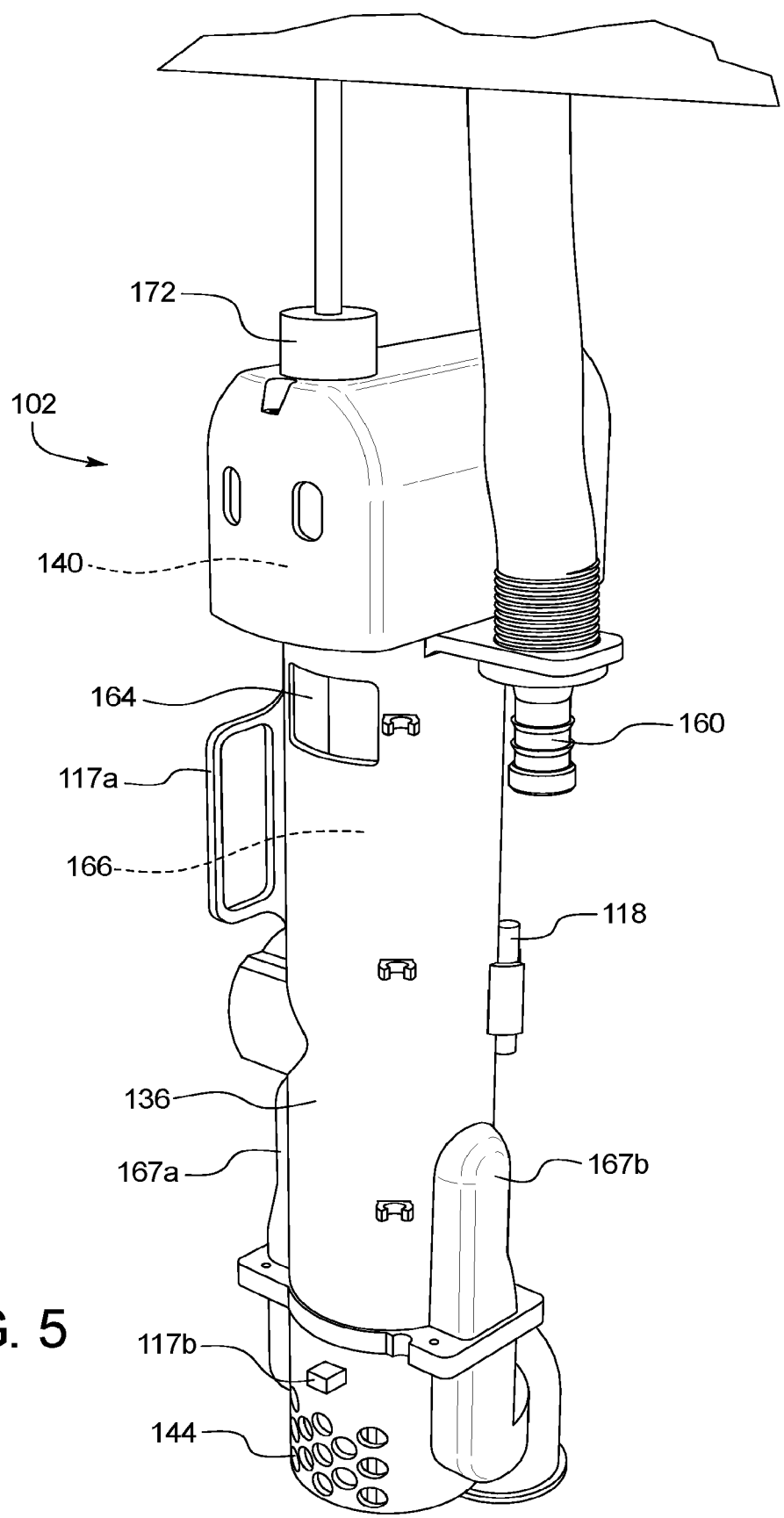
FIG. 5 is a rear perspective view of a basin operating device of the system shown in FIG. 3.
Figure 6:
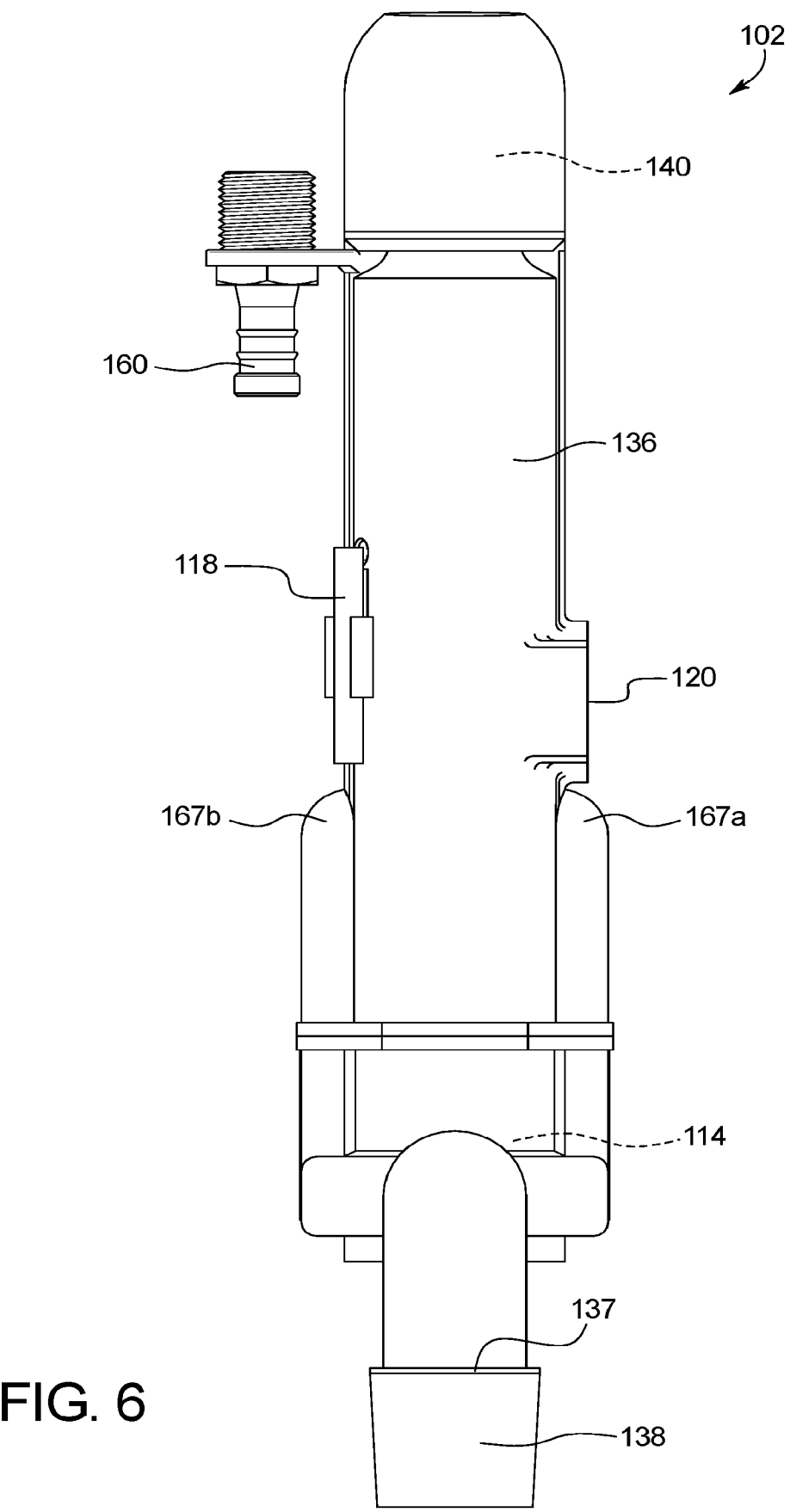
FIG. 6 is a front view of an embodiment of a basin device.
Figure 7:
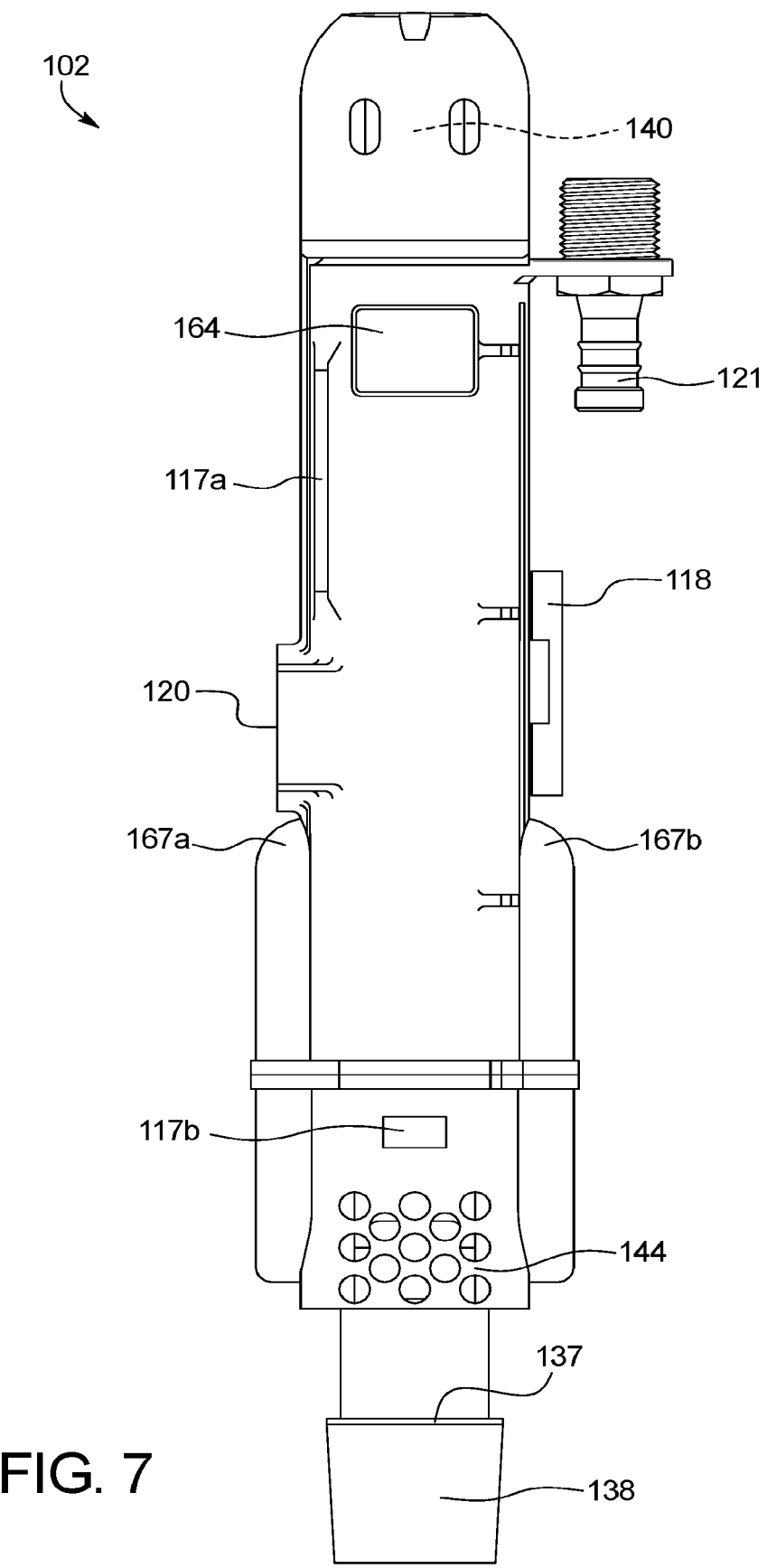
FIG. 7 is a back view of the basin device shown in FIG. 6.
Figure 8:
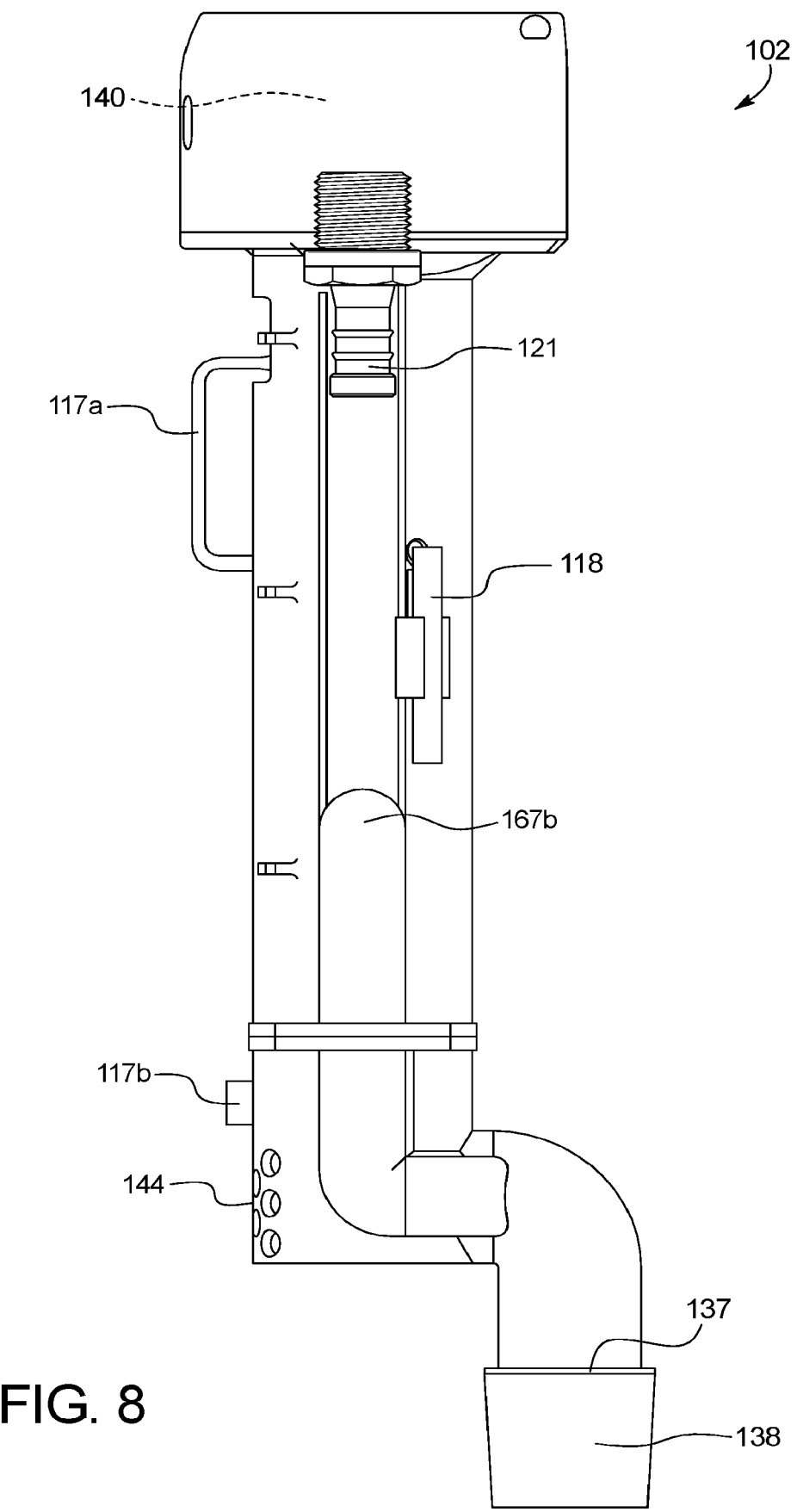
FIG. 8 is a left side view of the basin device shown in FIG. 6.
Figure 9:
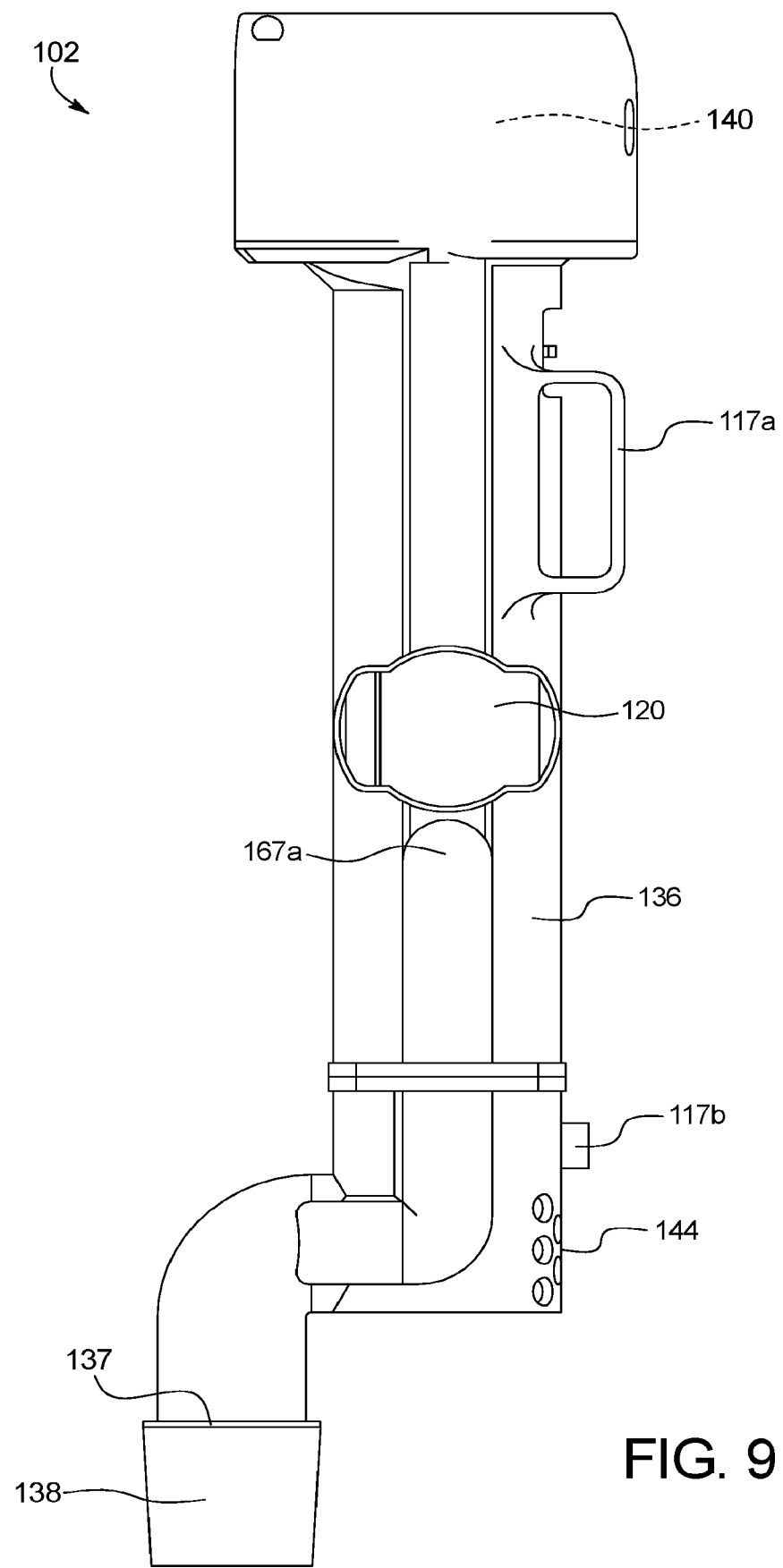
FIG. 9 is a right side view of the basin device shown in FIG. 6.
Figure 10:
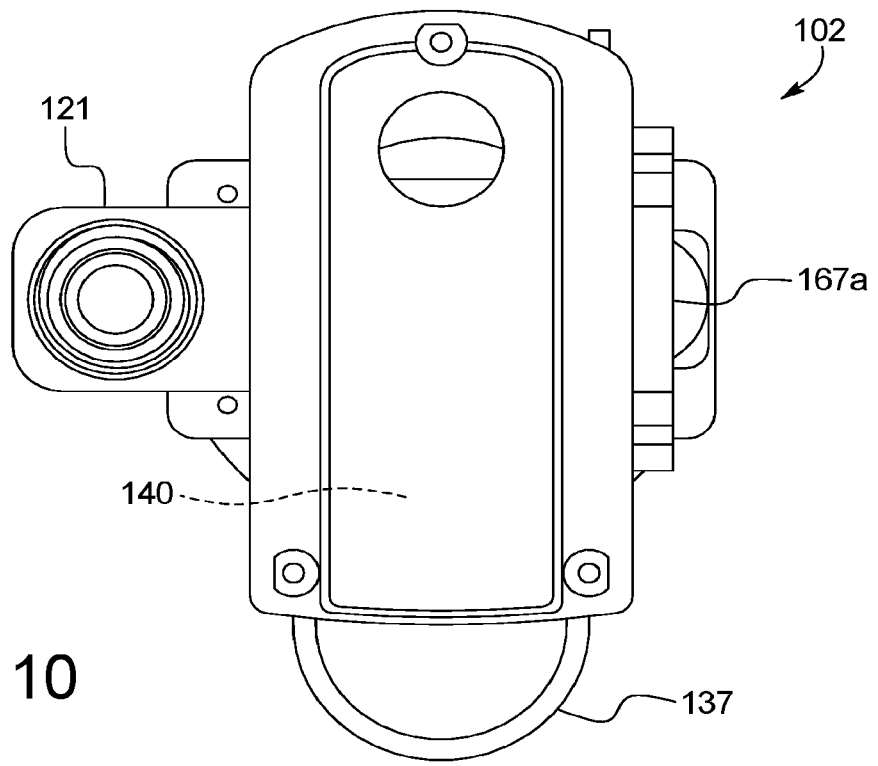
FIG. 10 is a top side view of the basin device shown in FIG. 6.
Figure 11:
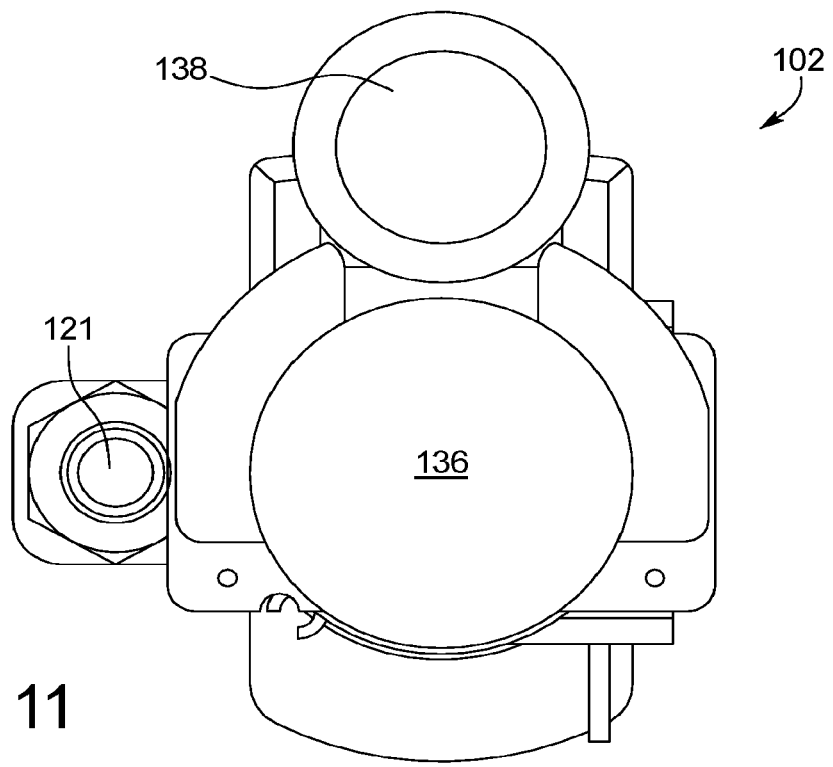
FIG. 11 is a bottom side view of the basin device shown in FIG. 6.
Figure 12:
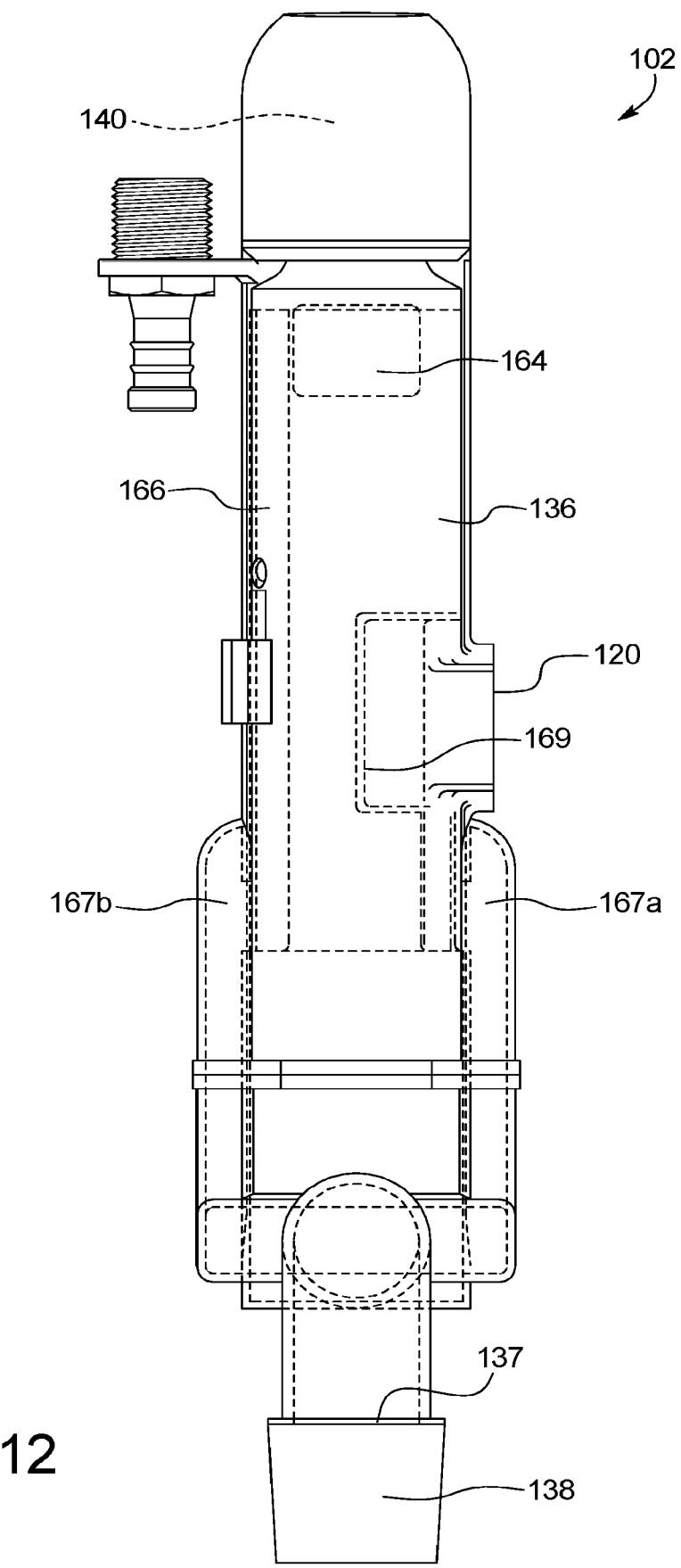
FIG. 12 is an internal view showing an overflow pipe within the basin device shown in FIG. 6.

As also shown in FIG. 5, an overflow outlet 164 is located near the top of the three-basin operating device 102. The overflow outlet 164 is positioned so that when the device 102 is installed, the outlet 164 is above the maximum liquid level at which the basin 103 is intended to be maintained. In the event that the basin 103 fills above this intended level, then before the liquid reaches the top of the basin 103 (and then spill over the basin's sides), the water will flow into the overflow outlet 164, through an overflow passage 166 (shown in FIGS. 13 and 14) inside the housing 136 of device 102 (seen in FIG. 12) and through first and second side passages 167a, 167b into the bottom portion of the housing 136. Even when the outlet valve 114 is closed as shown in FIG. 14, the overflow will flow through the outlet valve 114 because the wall of the barrel 114 includes a third opening 168 located such that, whether the barrel valve 114 is in the "open" or "closed" position with respect to the grate 144, one of the openings 148, 168 in the barrel valve 114 is aligned with the bottom outlet 145 of the overflow passage 166 so that fluid coming through the overflow passage 166 can always flow through the outlet valve 114 and into the drain 116. The device 102 may include additional internal tubing 169 to direct overflow around a cleanliness sensor 120, which in this embodiment is mounted at a side of housing 136. The overflow passage 166 can be integrated into the housing 136 or can be a tube, channel, or other conduit situated within the housing 136.

Referring to the embodiment shown in FIG. 5, the top of the device 102 may include an electrical connector 172 to operatively couple to the header 134 shown in FIGS. 3-5. The electrical connector 172 is for both the motor 140 controlling the drain outlet valve 114 at the bottom of the device 102 (the motor 140 in this example is housed in the wider portion along the top of the device 102) as well as the sensors 117, 118, 120.

FIGS. 6-12 show a prototype of one of the three-basin operating devices 102 described above. In the example shown in FIGS. 6-12, the sensors 117, 118, 120 include a first liquid level sensor 117a near the overflow outlet 164 near the top of the device 102 and a second liquid level sensor 117b near the grate 144 at the bottom of the device 102; a temperature sensor 118; and cleanliness sensors 120 (including a turbidity sensor and a pH sensor located along the sides of the device 102). Using two liquid level sensors 117a, 117b, the system 100 can be programmed to add water and, as appropriate, soap and/or sanitizer, to the basin 103 if the fluid level drops below the lower liquid level sensor 117b (minimum fill level), and to cease adding fluid to the basin if its level reaches the higher liquid level sensor 117a (maximum fill level). Alternatively, the lower liquid level sensor 117b may be used to detect when a basin 103 has been drained and is thus ready for refilling. In other embodiments, a single liquid level sensor 117 able to detect both an upper and lower level, and optionally any level in between, may be used. With three liquid level sensors 117, the system 100 may detect when the basin 103 is drained, when the maximum fill level has been reached, and any level in between, which in-between level could be a minimum fill level or a level to which to drain the basin when only a partial refill of the basin is desired. In one embodiment, the cleanliness of the liquid in the basin 103 is determined using a combination of the temperature, turbidity, and pH. In another embodiment, the cleanliness of the liquid in the basin 103 is determined using a combination of the turbidity and pH. In a third embodiment, the cleanliness of the liquid in the basin 103 is determined using only the turbidity. In a fourth embodiment, the cleanliness of the liquid in the basin 103 is determined using only the pH. In any embodiment, the turbidity and/or pH sensors can be used not only to check cleanliness of the liquid in the basin 103, but also to verify, when the basins 103 are first filled or re-filled, that the ratios of water to soap, water to sanitizer, or water to soap/sanitizer are at the appropriate levels. The choice between how complex and how many inputs to include in the cleanliness measurement may be based on a cost/benefit assessment of the number of sensors required to be incorporated into the system 100. It is also contemplated that the device 102 may include a greater or lesser number of sensors, that one or more of the sensors may be combined within a single unit, and that any or all of the sensors could be included in (or mounted to) device 102 or located elsewhere in the basin 103 but still in communication with system 100.

The feedback from the sensors goes to the processor 130 of the system 100, which in turn controls how much soap and sanitizer to combine with the water flowing into each basin 103. As noted above, the soap and sanitizer may be pumped from under the sink 104 using standard pumps.

Figure 15:
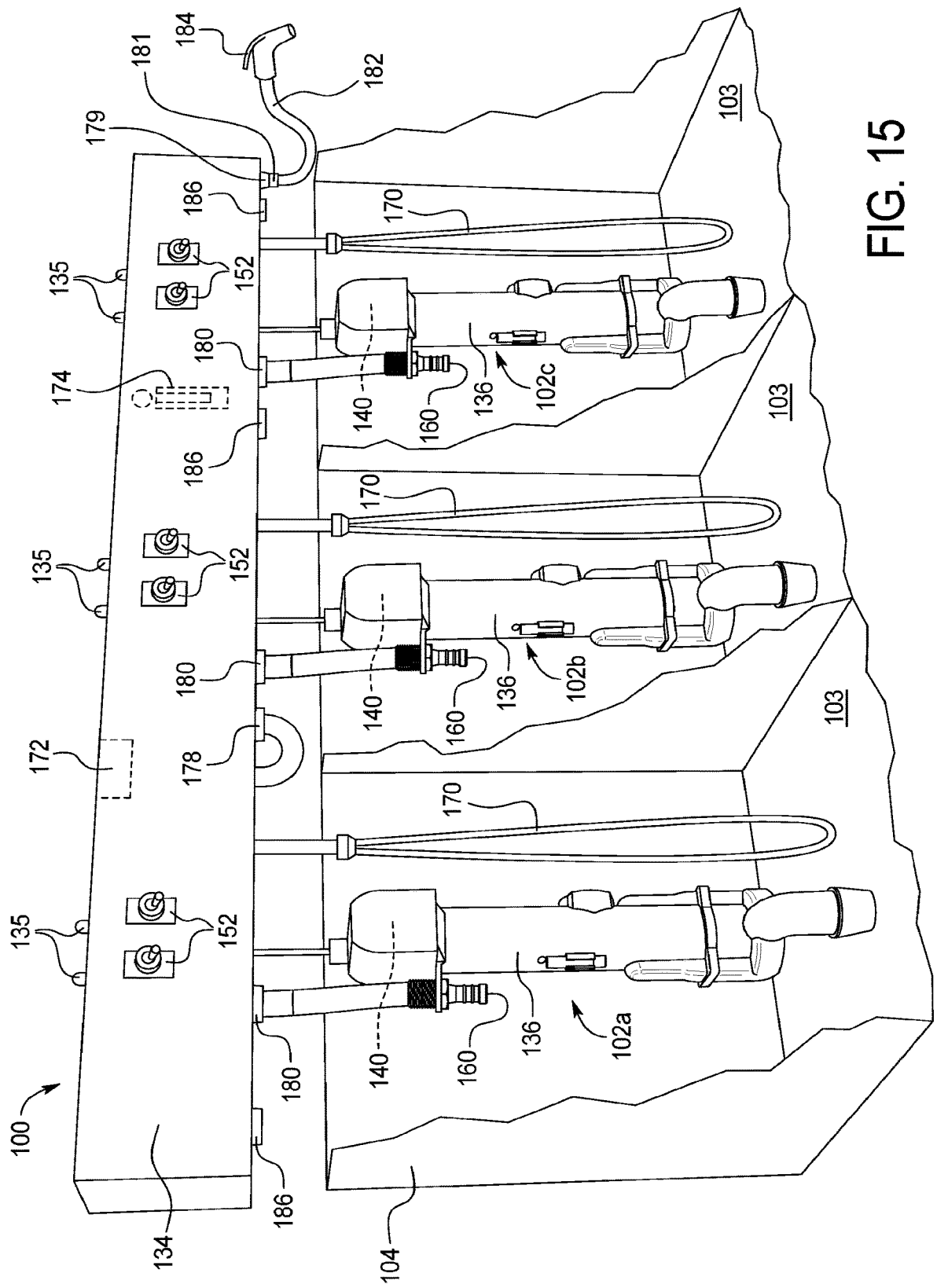
FIG. 15 is another example of elements of the system shown in FIG. 1 which includes a heater and an additional water spout.

As shown in FIG. 15 the system 100 could further include a heater 170 for each basin 103, such as a submersible heater 170, to maintain or help maintain the temperature of the solution within each basin 103 at the desired temperature level or within the desired temperature range. With this addition, the system 100 may require even less draining and refilling, thus leading to even greater efficiencies.

In one example, the system 100 determines a range of dirtiness (or cleanliness) of the liquid solution on a scale of 1-10 and records a log of the dirtiness (or cleanliness) of each basin 103 over time. The system 100 can be set so that it tolerates variations within a range, but then triggers draining and refilling if the dirtiness (or cleanliness) drops below the range or a certain minimum in the range. In another aspect of the invention, the temperature sensor 118 may trigger the refreshing of a basin 103 in response to the temperature of the solution dropping below a minimum level, such as 70 degrees Fahrenheit. In another aspect of the invention, the system 100 fully or partially drains any one of the basins 103 or all of the basins 103 after a pre-defined period of time, such as every sixty minutes, regardless of the temperature or dirtiness of the solution in the basin 103.

As shown in FIG. 1, the processor 130 receives data that enables the data capture, control, reporting, etc. functions of the system 100. In any of the embodiments described above, the system 100 captures, records and analyzes data relating its operation and conditions of the solutions in the basins 103, whether on a continuous or periodic basis. This data can include: the current status of the system 100, such as on, off, filling or draining, manual or automatic; the times of day at which the system 100 is turned on or off; the number of times the manual function is used; the durations of manual functions; the durations of time when the system 100 is on or off; the amount of time the system 100 is used for any given day, week, month, year-to-date or other period of time; the times of day at which the system 100 drains and then fills or refills each basin 103 and, for each such fill or refill, the amount of water, soap and sanitizer dispensed into the basin 103; the amount of soap and sanitizer remaining in the reservoirs for those supplies and the need to order more inventory of those supplies; the amount of water, soap and sanitizer used on average for fill or refill or during a date, week, month, year-to-date or other period of time; the amount of time it took to drain, fill or refill the basin 103; the cleanliness or water/soap/sanitizer solution ratio upon the completion of a fill or refill; and the temperature and cleanliness (or dirtiness), including direct or derived values for turbidity and/or pH; the rate at which temperature and/or cleanliness (dirtiness) changes over any given period of time or between any given fill/refill operation, etc.

This data can be captured and analyzed for a single system 100 or multiple systems 100. The data for a single system 100 can be analyzed over time to determine efficiencies realized in the establishment's operations, including for example the amount of savings of water, soap, sanitizer and personnel time. This data can also serve as an auditable record of the establishment's compliance with regulations, thus helping the establishment to avoid costly and reputation-harming citations for non-compliance. The data can also be used to identify additional opportunities for improved efficiency. Furthermore, data across multiple systems 100, whether deployed in a single establishment or across multiple establishments can be aggregated, analyzed, and compare for a variety of purposes, including without limitation, showing how the operation and efficiency of the system (or of the establishment's operations) at one three-basin sink 104 compares to that of another three-basin sink 104 or that of another establishment, how one establishment's system(s) or operations compare to the average of those of another establishment's system(s)/operations or a group of establishments' system(s)/operations.

For operation and use, the system 100 is installed on a three-basin sink 104. The header 134 is mounted to the backsplash of the sink 104. The original spout on the three-basin sink 104 is removed and the inlet water valve 106 for the system 100 is connected to the three-basin sink 104 via spout 108 in its place. The plug at the bottom of each three-basin operating device 102 is plugged into the drain 116 of a respective basin 103 of the three-basin sink 104. Reservoirs containing soap and sanitizer are placed nearby and hoses from the system 100 for feeding in the soap and sanitizer are connected to the reservoirs. The reservoirs include liquid level sensors 117 for detecting when the fluid in the reservoir has dropped to a near empty condition. One or more electrical cords for providing power to the system 100, including the motors, valves, electronics and computers, are plugged into the outlets of the establishment. The water supply is turned on (typically by using the hot/cold handles on the three-basin sink 104), such that the incoming water is at or above the minimum desired temperature, and the power of system 100 is turned on.

In one embodiment, the user launches an application on his/her mobile device, laptop, or other computing device through which the user interacts with the other components of the system 100. The application may be cloud-based and thus accessed by the user through an ordinary browser installed on the computing device. Using the application's GUI, the user sets the operating parameters for the system 100, such as water temperature (or range of temperature), turbidity and/or pH (or ranges thereof), and ratios of water to soap and/or sanitizer, as needed for each basin 103 of the sink 104. The operating parameters may also include a setting ("auto-refresh") for automatically draining and filling the basins after predetermined periods of time (such as every 60 minutes) regardless of the condition of the solution in the basins 103. The user may also enter the total amount of the establishment's inventory of soap and sanitizer, which from thereon the system can use to track the establishment's remaining inventory.

Figure 17:
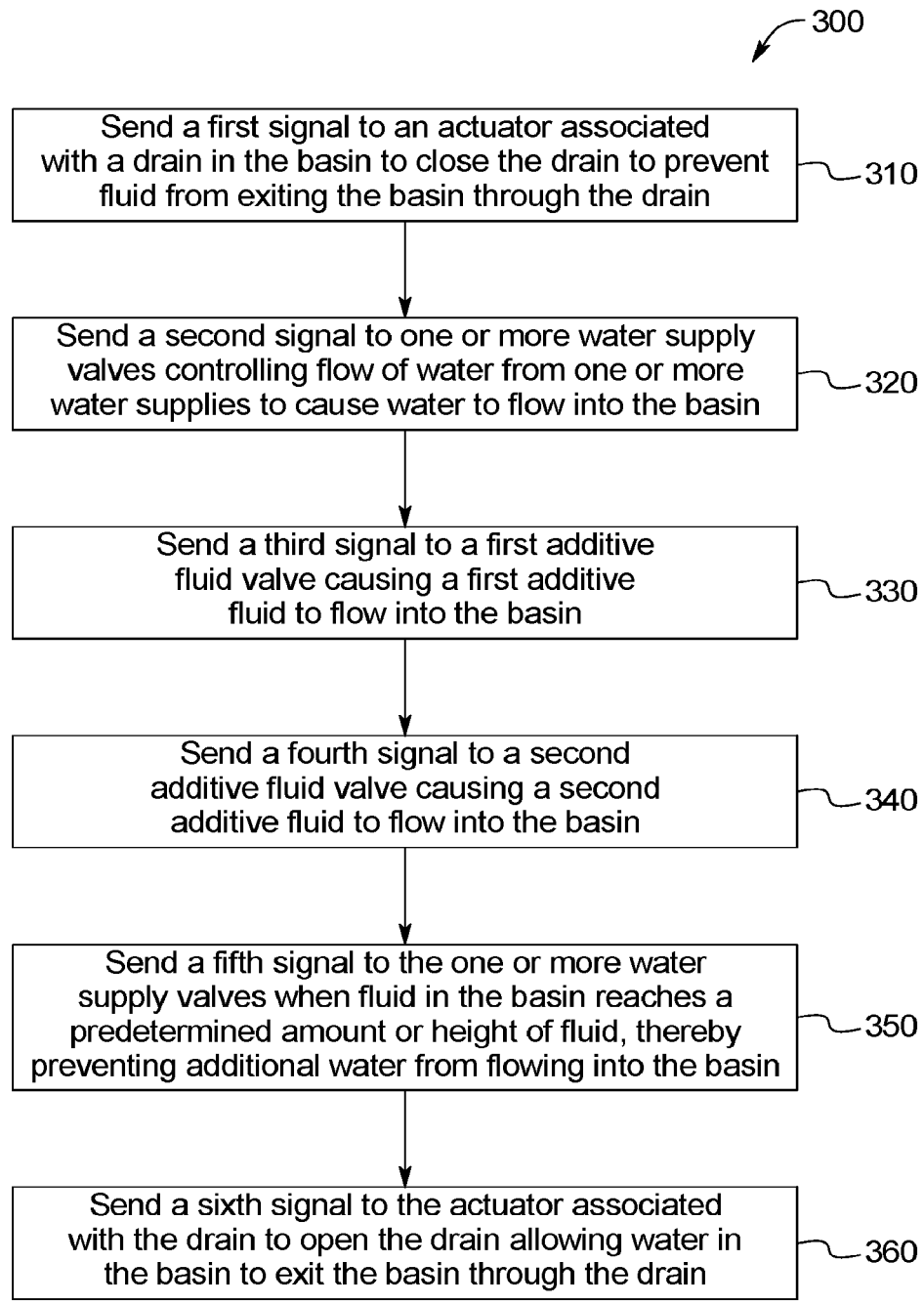
FIG. 17 is a flow chart illustrating the steps of a method of using the system of FIG. 1.

FIG. 17 illustrates one example method 300 of using the system 100 of FIG. 1. The user activates the system 100, whereupon the system 100 closes the drain (step 310) begins to fill each basin 103 with the appropriate amounts of water (step 320), soap (step 330), and sanitizer (step 340). The system 100 shuts off the respective water supply when the solution in the basin 103 reaches a level that trips a higher liquid level sensor 117a (step 350). The system 100 uses the temperature sensors 118, and cleanliness sensors 120 (turbidity and/or pH sensors) to continuously or periodically monitor the temperature and cleanliness of the solutions in each basin 103. When the system 100 detects that the temperature or cleanliness of a basin 103 has dropped below a minimum level, it fully or partially drains the basin 103 (step 360) and then closes the drain (step 310), refills it with fresh water (step 320), soap (step 330), and/or sanitizer (step 340) as needed. If the system 100 has been set for auto-refresh, then it also drains (step 360) and refills each basin 103 (steps 310, 320, and 330) at the appropriate time. The system 100 uses a lower liquid level sensor 117b to determine when the basin 103 has been drained and thus ready for refill. When the system 100 detects that a soap or sanitizer reservoir (i.e., the soap reserve 122 and the sanitizer reserve 124) has reached a near empty condition, it alerts the user so that the user can replace or refill the reservoir. Additionally, as the system 100 tracks its usage of soap and sanitizer, it is able to compute the establishment's total remaining inventory of soap and sanitizer and if it detects that the inventory is nearing depletion, it can automatically initiate an online purchase of additional supplies from a connected vendor. The system can also receive data when the additional supplies arrive, either automatically or via user input, so that it can continue to track the total inventory of soap and sanitizer and order more when needed.

Meanwhile, the system 100 captures and records all of the data concerning operation of the system 100 and the conditions of the solutions in each basin 103 and reservoirs, as described above. The data, or analysis based on the data, is presented to the user at the GUI or otherwise made available to the user. Additionally, the system 100 can send alerts to the user indicating each time the system 100 performs a drain and/or refill operation, each time the system 100 is turned on/off or placed into manual mode, or if the system 100 is not working properly. Additionally, at any given moment in time, the user is able to see whether the system 100 is on and, if it's on, the status of each basin 103, reservoir and its conditions. The user is also able to see the historical performance of the system 100, including the total and average amounts of water, soap and sanitizer used.

In the manual mode, the user presses or otherwise activates a button or switch (mechanical or digital) to cause the basin 103 of the sink 104 to automatically fill. Upon such activation, the drain 116 closes and then water flows into the basin 103 until the water reaches the upper limit of the liquid level sensor 117a, at which time the flow to the basin 103 stops. For any basin 103 in which soap and/or sanitizer is to be included, a flow of soap and/or sanitizer automatically occurs as well. To drain a basin 103, the user presses or otherwise activates a button or switch (which can be the same button/switch used to activate filling or may be a different button/switch), whereupon the drain 116 opens and the fluid flows out of the basin 103 through the drain 116. The manual mode can be set so that when the draining is completed (as detected by the lower limit of the liquid level sensor 117b), the system 100 can either sit idle while it waits for the next instruction (such as "fill" or "off"), or it can be set to automatically refill the basin 103 by closing the drain 116 and then filling the basin 103 as described above.

Figure 16:
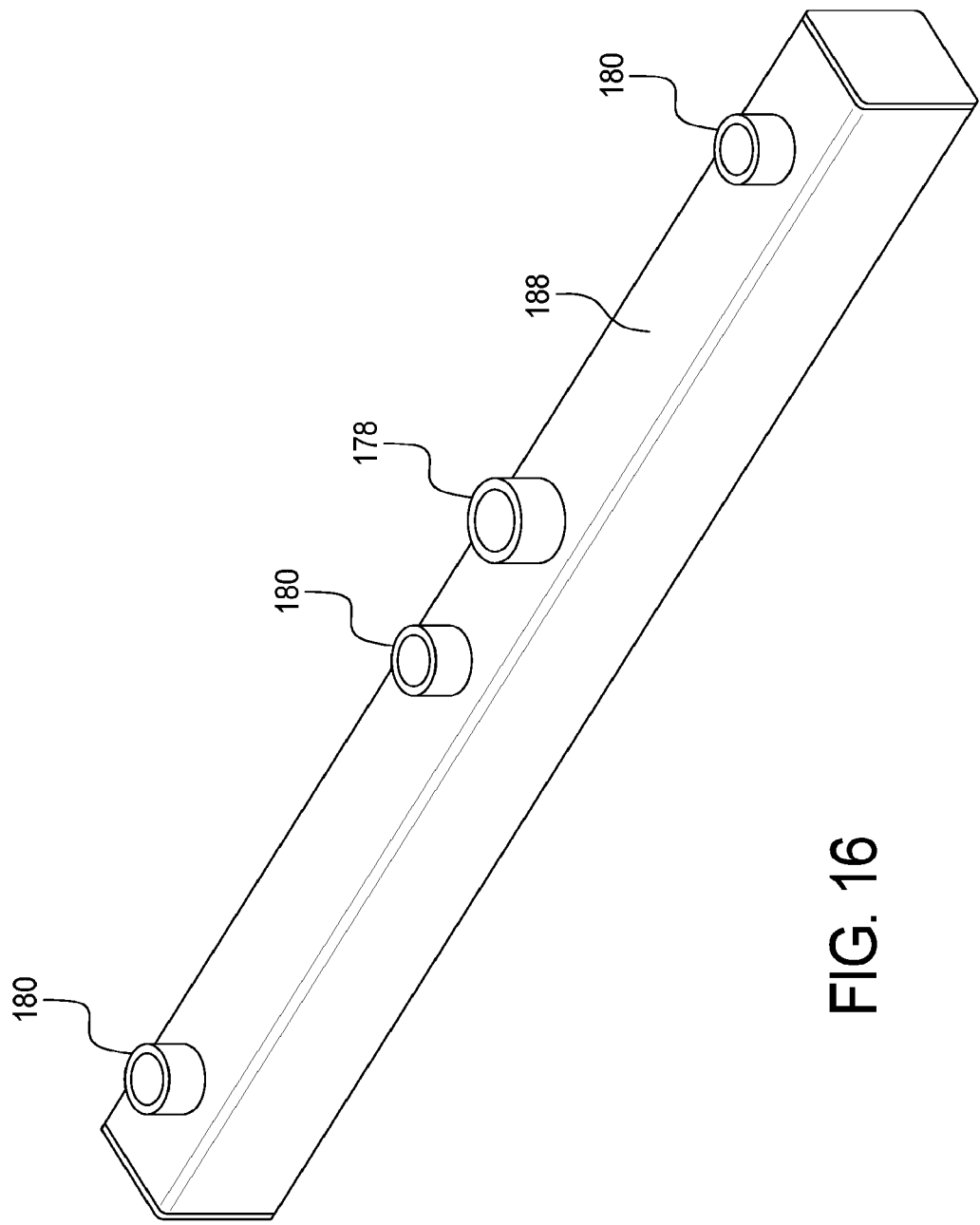
FIG. 16 is a perspective view of a manifold for use in the basin device shown in FIG. 15.

In the embodiments illustrated in the Figures, the water supply flows through pipes, such as ordinary copper pipes, situated in the header, which branch off to provide water outlets for each operating device 102 or basin. In another embodiment, a manifold 188 (FIG. 16) could be used, such as a substantially rectangular vessel having an inlet 178 for connecting to the fresh water supply and outlets 180 for supplying water to each operating device 102 or basin. The manifold could be sized to hold a more substantial volume of water than would be contained in ordinary copper pipes. This can aid in the system's ability to fill two or more basins simultaneously regardless of the establishment's normal water pressure.

Turning back to FIG. 15, the header 134 may include one or both of a temperature sensor 172 and a heater 174, for helping to ensure that the water residing in the header 134 (whether supplied through pipes or a manifold within the header) is maintained at a desired temperature between basin-filling operations. Additionally, or alternatively, the header 134 (or water pipes or manifold within the header) may be insulated so that water residing therein maintains its temperature for a longer period of time versus a non-insulated header 134 (or pipes or manifold). The water lines exiting the header 134 for filling each basin 103 may include heaters 176, such as in-line heaters 176, (see FIG. 1) for heating the water flowing to the basins 103 to a desired temperature. The system 100 may be set to purge some or all of the water in the header 134 prior to a filling operation to eliminate water that is below a desired temperature prior to beginning to fill a basin 103. After a basin 103 is fully or partially drained, the drain outlet valve 114 may be set to stay open (or, if it is closed, to be open) for a period of time while water flows from the header 134. Meanwhile, fresh, hotter water fills the header 134. The drain outlet valve 114 then closes and water from the header 134 continues to flow to the basin 103, such that the basin 103 fills with water at the desired temperature.

Additionally, in some cases, it may be useful for the user to be able to access fresh water at the basin 103 independent of the spout 160 associated with each three-basin operating device 102. This additional water supply 181 (FIG. 15) may be used for any desired purpose, including cleaning the sink 104 and basins 103 themselves, washing hands, and cleaning the three-basin operating devices 102 or other elements of system 100. This additional water supply 181 may be used for filling the basins 103 on occasions where the user desires not to use the system 100. To this end, the system 100 may include an additional outlet 179 (whether a branch of a pipe or an outlet in a manifold) including a water valve, and spout, pipe, tube, or hose connected thereto, as will be recognized by those skilled in the art. For example, a hose 182 may be a flexible hose including a sink sprayer 184 at its outlet end. The valve may be set so that it will only open to allow use of this additional water supply when such use will not interfere with the system's proper maintenance of the fluids in the basins 103, such as when the system 100 confirms that the basins 103 are empty or that automatic operation of system 100 is in an "off" mode.

The systems, apparatuses and methods disclosed herein may further include a vision system 186 comprising one or more cameras, other vision sensors, and/or motion sensors or systems, for detecting when one or more of the basins 103 is being used and the manner in which it is being used. For example, a vision system 186, such as a camera alone or in combination with a motion sensor, may detect that a user is cleaning glasses, such as by using an electric spinning brush system, in the basin 103 containing water and soap, and may measure the length of time spent cleaning a particular glass and whether the glass was properly and fully engaged with the spinning brush system. The data relating to when a basin 103 is being used and the manner in which it is being used may be captured, analyzed and presented to the user by way of the processor 130, including generating alerts, as described earlier with respect to other data relating to system 100.

It should be noted that various changes and modifications to the presently preferred embodiments described herein will be apparent to those skilled in the art. Such changes and modifications may be made without departing from the spirit and scope of the present invention and without diminishing its attendant advantages.

It should also be noted that while particular combinations of features have been described, the scope of the present invention is not limited to the particular combinations presented herein, but instead extends to encompass any combination of features disclosed. Among other things, and without limitation, a useful embodiment may comprise temperature and cleanliness sensors and the ability to capture, analyze and present information about temperature and cleanliness to a user, without including elements for automatically filling and draining basins. Such a system may alert a user to the need to drain and/or fill the basins and to add appropriate amounts of water, soap and sanitizer, which the user could do using a traditional approach or a manually operated version of system 100

In addition, while embodiments of the present invention have been described in the context of software modules that are executable by a processor, it should be noted that the scope of the present invention is not limited to an implementation of the teachings of the invention in software. Rather, the skilled person will immediately appreciate that the functionality described herein may equally be implemented in hardware (for example, by means of a plurality of application-specific integrated circuits (ASICS)) or, indeed, by a mix of hardware and software.

The invention claimed is:

1. An operating assembly for use with a sink or bathtub having at least one fluid-holding basin and a basin drain, comprising:
   an actuator;
   a housing, the housing comprising:
      a plug structure at, or near, a bottom portion of the housing for selectively blocking the basin drain;
      a drain valve comprising an inlet adjacent a bottom portion of the housing controlled by the actuator to be in an open position or a closed position, wherein the inlet of the drain valve is provided on a first side of the housing, and wherein an outlet of the drain valve is provided on a second side of the housing opposite the first side and directs fluid into the plug structure;
      wherein the plug structure mates with the basin drain to prevent fluid in the at least one fluid-holding basin from escaping into the drain other than through the drain valve; and
      wherein, when the drain valve is in the open position, fluid in the at least one fluid-holding basin is able to flow through the drain valve into the basin drain and, when the drain valve is in the closed position, fluid in the at least one fluid-holding basin is unable to flow through the valve into the basin drain; and
   a processor configured to send commands for controlling the actuator, such that in response to the commands from the processor, the actuator opens or closes the drain valve such that the operating assembly is capable of automatically draining the at least one fluid-holding basin;
   wherein the processor is in communication with a water valve operable between open and closed conditions to selectively deliver water to the at least one fluid-holding basin; and wherein the processor is configured to:
      receive input from a temperature sensor, a cleanliness sensor, and a liquid level sensor; and
      send commands for controlling the actuator and the water valve such that in response to the commands from the processor, the actuator is configured to open or close the drain valve and the water valve is capable of opening or closing such that the operating assembly is capable of automatically filling and draining the at least one fluid-holding basin to maintain a desired range of concentrations of a fluid comprising one or more of water, soap, and sanitizer, and to maintain the fluid in one of the at least one fluid-holding basins at a desired amount or height and within a desired range of temperature.

2. The operating assembly of claim 1, wherein the processor is in communication with one or both of a soap dispenser pump and a sanitizer pump operatively connectable to soap and sanitizer reserves, respectively, and operable between active and inactive conditions for selectively delivering soap and sanitizer from the respective reserves to the at least one fluid-holding basin.

3. The operating assembly of claim 2, wherein the processor is configured to send commands for controlling the actuator, the water valve, and the soap and/or sanitizer dispenser pumps such that, in response to the commands from the processor, the actuator opens or closes the respective drain valve, the water valve opens or closes, and the soap and/or sanitizer dispenser pumps are active or inactive, such that the operating assembly is capable of automatically filling and draining the at least one fluid-holding basin to maintain a desired range of concentrations of a fluid comprising one or more of water, soap, and sanitizer, and to maintain the fluid in the at least one fluid-holding basin at a desired amount or height and within a desired range of temperature.

4. The operating assembly of claim 1, wherein the cleanliness sensor comprises one of a turbidity sensor and a pH sensor.

5. An assembly for placement in a sink or bathtub having one or more basins having a drain comprising:
   a passageway defined by an adapter through which, when the assembly is in use in a basin, fluid in the basin is able to flow toward the drain;
   a structure in fluid communication with and upstream of the passageway operable between open and closed positions selectively blocking the passageway when in a closed position and not blocking the passageway when in an open position, such that fluid in a basin is able to flow through the passageway when the structure is in the open position but not when the structure is in the closed position,
      wherein an inlet of the structure is provided on a first side of the structure, and wherein an outlet of the structure is provided on a second side of the structure opposite the first side and directs fluid into the adapter;
      wherein the adapter mates with the basin drain to prevent fluid in the basin from escaping into the drain other than through the structure;
   an actuator controlling the position of the structure between the closed position and the open position; and
   a processor configured to send commands for controlling the actuator, such that in response to the commands from the processor, the actuator opens or closes the drain valve such that the assembly is capable of automatically draining the basin;
   wherein the processor is in communication with a water valve operable between open and closed conditions to selectively deliver water to the basin; and
wherein the processor is configured to:
   receive input from a temperature sensor, a cleanliness sensor, and a liquid level sensor; and
   send commands for controlling the actuator and/or the water valve such that in response to the commands from the processor, the actuator opens or closes the drain valve and/or the water valve open or close such that the assembly is capable of automatically filling and draining the basin to maintain a desired range of concentrations of a fluid comprising one or more of water, soap, and sanitizer, and to maintain the fluid in each basin at a desired amount or height and within a desired range of temperature.

6. The assembly of claim 5, wherein the actuator is in communication with the processor, and wherein the processor is configured to receive one or more inputs from the liquid level sensor and a further liquid level sensor determining at least a first fluid level in the basin and a second fluid level in the basin, and wherein the processor is configured to:
   receive one or more inputs from the one or more of the temperature sensor, the cleanliness sensor, and the liquid level sensor; and
   in response to receiving a first set of one or more inputs from the one or more of the temperature sensor, the cleanliness sensor, and the liquid level sensor, generate and communicate a first set of one or more outputs to the actuator causing the actuator to position the structure in the open position, and
   in response to receiving a second set of one or more inputs from the one or more of the temperature sensor, the cleanliness sensor, and the liquid level sensor, generate and communicate a second set of one or more outputs to the actuator causing the actuator to position the structure in the closed position.

7. The assembly of claim 6, wherein the water valve is configured to control a flow of fluid from a water source into the basin, wherein operation of the water valve is controlled by the processor in response to the one or more inputs from the one or more of the temperature sensor, the cleanliness sensor, and the liquid level sensor.

8. The assembly of claim 6, further comprising a first additive fluid valve configured to control flow of a first additive fluid into the basin, wherein operation of the first additive fluid valve is controlled by the processor in response to the one or more inputs from the one or more of the temperature sensor, the cleanliness sensor, and the liquid level sensor.

9. The assembly of claim 8, further comprising a second additive fluid valve configured to control flow of a second additive fluid into the basin, wherein operation of the second additive fluid valve is controlled by the processor in response to the one or more inputs from the one or more of the temperature sensor, the cleanliness sensor, and the liquid level sensor.

10. The assembly of claim 9, wherein the first additive fluid is a soap and the second additive fluid is a sanitizer.

* * * * *